US 007599856B2

(12) United States Patent
Agrawal et al.

(10) Patent No.: US 7,599,856 B2
(45) Date of Patent: Oct. 6, 2009

(54) DETECTION OF FRAUDULENT ATTEMPTS TO INITIATE TRANSACTIONS USING MODIFIED DISPLAY OBJECTS

(75) Inventors: Ashish Agrawal, Seattle, WA (US); Robert Frederick, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1309 days.

(21) Appl. No.: 10/299,963

(22) Filed: Nov. 19, 2002

(65) Prior Publication Data
US 2004/0098313 A1    May 20, 2004

(51) Int. Cl.
G06Q 30/00 (2006.01)
G06Q 20/00 (2006.01)

(52) U.S. Cl. .............................. 705/26; 705/75; 705/76
(58) Field of Classification Search ........................ None
See application file for complete search history.

(56) References Cited

U.S. PATENT DOCUMENTS

| | | | |
|---|---|---|---|
| 4,868,877 A * | 9/1989 | Fischer | 713/157 |
| 5,815,665 A | 9/1998 | Teper et al. | |
| 5,943,424 A * | 8/1999 | Berger et al. | 705/64 |
| 5,960,411 A | 9/1999 | Hartman et al. | |
| 6,012,144 A * | 1/2000 | Pickett | 726/26 |
| 6,029,141 A | 2/2000 | Bezos et al. | |
| 6,070,142 A | 5/2000 | McDonough et al. | |
| 6,275,824 B1 | 8/2001 | O'Flaherty et al. | |
| 6,330,575 B1 | 12/2001 | Moore et al. | |
| 6,360,254 B1 | 3/2002 | Linden et al. | |
| 6,363,357 B1 * | 3/2002 | Rosenberg et al. | 705/26 |
| 6,629,135 B1 * | 9/2003 | Ross et al. | 709/218 |
| 6,804,660 B2 * | 10/2004 | Landau et al. | 705/14 |
| 6,853,987 B1 * | 2/2005 | Cook | 705/75 |
| 6,993,572 B2 * | 1/2006 | Ross et al. | 709/218 |
| 7,020,622 B1 | 3/2006 | Messer | |
| 7,024,552 B1 * | 4/2006 | Caswell et al. | 713/155 |
| 7,028,072 B1 * | 4/2006 | Kliger et al. | 709/203 |
| 7,032,168 B1 * | 4/2006 | Gerace et al. | 715/501.1 |
| 7,069,234 B1 * | 6/2006 | Cornelius et al. | 705/26 |
| 7,103,566 B2 * | 9/2006 | Silva et al. | 705/26 |
| 7,159,116 B2 * | 1/2007 | Moskowitz | 713/176 |
| 7,229,009 B1 * | 6/2007 | Parsons et al. | 235/379 |
| 7,240,214 B2 * | 7/2007 | Gazzetta et al. | 713/182 |
| 2005/0145690 A1 * | 7/2005 | Shibasaki | 235/379 |

FOREIGN PATENT DOCUMENTS

WO    WO 01/43033 A1    6/2001
WO    WO 02/37233 A2    5/2002

OTHER PUBLICATIONS

Nutek Inc. Announces Opening of Online Shopping Mall, Business Wire, p. 51; Oct. 21, 1999.*
U.S. Appl. No. 09/547,540, filed Apr. 12, 2000, Amazon.com, Inc. (Assignee).
"*LinkShare Launches Affiliates Profiling Software; First to Integrate Personalization Software Into Affiliates Program*" PR Newswire Association Inc., dated Feb. 24, 1998.
Sohn, A., and Pontilena, C., "*Instabuy From Cybercash Offers Easy and Safe Buying Solution to Online Consumers and Merchants*" Instabuy Press Release, dated Aug. 19, 1998.

(Continued)

*Primary Examiner*—Matthew S Gart
*Assistant Examiner*—John Shin
(74) *Attorney, Agent, or Firm*—Knobbe, Martens, Olson & Bear LLP

(57) ABSTRACT

A network-based payment service provides various features for facilitating online, user-to-user payments and item purchases. One feature involves methods for validating transaction requests initiated during browsing of third party web sites, including web sites of associates.

33 Claims, 24 Drawing Sheets

OTHER PUBLICATIONS

Sohn, A., "*Cybercash Unveils "Instabuy.com" Website For Consumer One-Click Shopping Online*" Instabuy Press Release, dated Feb. 22, 1999.

Guglielmo, C., "*A Tale of Two One-Click Initiatives*" INTER@CTIVE WEEK, dated Mar. 30, 1999.

"*Understanding Instabuy—A Consumer and Merchant Overview*" 8 page document printed from www.instabuy.com on May 1999.

"*The Instabuy Consumer Experience*" printed from www.instabuy.com.

Davis, J., "*Content Sites Find Possible Revenue Source*" Infoworld, dated Jan. 8, 2001.

\* cited by examiner amazon.com   🛒 | (YOUR ACCOUNT) | HELP

| YOUR PAYPAGE ACCOUNT | MANAGE PAYPAGES | HELP |

You currently have $450.00 in Your PayPage Account.

Manage all aspects of your PayPages from this one convenient location. Learn more about managing your PayPages.

Top 5 Questions

1. How do I edit a PayPage?
2. Can I have more than one PayPage?
3. How do I create additional pay boxes?
4. How do I delete a PayPage?
5. Should I have PayPage associates?

You Have 3 Active Pages   (Create a new PayPage)

Steven Smith's The Fern   (Edit) (Delete)
Created: 08/08/2000

- View this PayPage
- Manage this PayPage's pay boxes.
- Send payment request

---

Amy's PayPage   (Edit) (Delete)
Created: 08/08/2000

- View this PayPage
- Manage this PayPage's pay boxes.
- Send payment request

Become a PayPage Associate!
Host your favorite website's PayBox. Earn money for you both.
▶Here's how.

FIG. 5

 *Manage PayPage* step one

Customize Your PayPage

Every PayPage has several features so you can tailor the PayPage to your specific needs. Click Edit in each category to customize your PayPage settings. When all your settings are correct, click Continue to preview your PayPage. See a sample PayPage.

( Continue ▶ )

1. Your Messaging (required)
Click Edit to make changes. Learn more.

| | |
|---|---|
| PayPage Description: | Welcome to my PayPage. Payment is... |
| Thank-you Message: | Thank you for visiting my PayPage. I appreciate... |
| Thank-you E-mail: | Again, thank you for visiting my PayPage. I... |

( Edit )

2. Your Title and Color Scheme (optional)
Click Edit to make changes. Learn more.

| | |
|---|---|
| PayPage Title: | [registrant's name]'s PayPage |
| Text Color: | ▓▓▓▓▓ |
| Background Color: | ▓▓▓▓▓ |

( Edit )

3. Your PayPage's Image (optional)
Click Edit to make changes. Learn more.

Uploaded Image: C://mypictures/paypage.jpg ( Edit )

4. Your Payment Settings (optional)
Click Edit to make changes. Learn more.

Default Amount: $x.xx
Minimum Amount: $x.xx ( Edit )

5. Your Advanced Settings (optional)
Click Edit to make changes. Learn more.

Allow other Amazon.Com Customers to become associates for this PayPage: Yes
Your Location: Seattle
E-mail address: email@email.com
Thank-you Page URL: http://www.url.com ( Edit )

6. Your Payment Counter (optional)
Click Edit to make changes. Learn more.

Display: Number of Payments
Goal Graph: Yes
Goal Amount: $xxxx.xx ( Edit ) ( Continue ▶ )

*FIG. 6*

Manage PayPage
step three

Choose a Pay Box Style

A paybox should compliment your website. Choose the paybox style you prefer and click Continue. You'll customize the paybox in the next step. You can always return to this page later. Go to Manage Pay Pages if you prefer not to select a paybox now.

Select One     Style

○   Hello, Griffen.
    Please pay
    $1 per MP3
    [Click to Pay!]
    amazon honor system
    How do we know your name?
    120 x 120

○   Hello, Griffen.
    Please pay
    $1 per MP3
    [Click to Pay!]
    amazon honor system
    How do we know your name?
    125 x 125

⦿   Hello, Griffen McDade.
    Pay $1 for each
    MP3 you download.
    [Click to Pay!]
    amazon honor system
    How do we know your name?
    200 x 115

○   Hello, Griffen McDade.
    Please pay $1 for
    each MP3
    you download.
    [Click to Pay!]
    amazon honor system
    How do we know your name?
    200 x 200

○   Hello, Griffen McDade.
    Pay $1 for each MP3 you download.    [Click to Pay!]
    amazon honor system                   How do we know your name?
    486 X 60

Manage PayPage
step five

Preview and Install Your Pay Box
Here is a preview of the pay box you created. Now, you can either:

1. click Edit to make corrections;
2. follow the instructions to install the pay box on your website in the Install the Pay Box section below; or,
3. click Continue to save this pay box and return here later for installation instructions.

Preview of your pay box

```
Hi, Griffen McDade.
Support Phowl! Pay $1 for each
MP3 you download.
  Click to Pay!
amazon honor system
How do we know your name?
```

( Edit )                                                    ( Continue ▶ )

Install the pay box

Please follow the directions below to install the pay box on your website. If you want more detail than the directions below provide, click the more detailed instructions link near the bottom of this page. Please click Continue when you are finished.

Here's the HTML code for your pay box:

```
<img src =
"http://www.amazon.com/exec/varzea/tipbox/A1XOXFS37WTVOF/TMLPQ4D5H3GYZ/Z01Y2455306Y5123188
 gif"usemap="#tipmap">
  <map name="tipmap">
  <area coords="40, 100, 160, 160" href="http://www.amazon.com/exec/varzea/payP2K22M0VKTMB0P?
amount=1.00">
  <area coords="23, 183, 178, 195" href="http://www.amazon.com/exec/varea/subst/financial-exchange
/help/pay-box-placement.html">
  </map>
```

Directions

- Highlight and copy the HTML code in the box above.
- Paste the copied HTML code into the appropriate place in your web page's HTML code. Your identifying information is already imbedded in the HTML.
- You don't need to copy any graphic because the HTML code already specifies the graphic you want.

( Continue ▶ )

FIG. 10 amazon.com

| YOUR PAYPAGE ACCOUNT | MANAGE PAYPAGES | HELP |

Manage PayPages > Manage Pay Boxes

The pay boxes you created for this PayPage are shown below. Click to Edit or Delete any of the pay boxes or to Add a New Pay Box.

You have 3 active Pay Boxes                     ( Create a new Paybox )

Hello, Griffen McDade.
Support Phowl! Pay $1 for each MP3 you download.
(D) Click to Pay!
amazon honor system
How do we know your name?

( Edit ) ( Delete )

▶ Preview and add this link to a website.

---

Hello, Griffen.
Please pay
$1 per MP3
(D) Click to Pay!
amazon honor system
How do we know your name?

( Edit ) ( Delete )

▶ Preview and add this link to a website.

---

Hello, Griffen McDade.
Support Phowl! Pay $1 for each MP3 you download. (D) Click to Pay!
amazon honor system                              How do we know your name?

( Edit ) ( Delete )

▶ Preview and add this link to a website.

*FIG. 11* amazon.com  🛒 | (YOUR ACCOUNT) | HELP

SEARCH

Search for PayPages to Associate with. Fill in Name or Description and click Go!

Name or Description:

[Animal Society] (GO)

City: (optional)

[          ]

State: (optional)

[          ]

Top Questions

1. Who can I be an Associate of?
2. What is a Paybox?
3. How much do I earn?
4. How do I get my money?
5. How can I market a Paybox?

Associates How-To
Here's everything you'll need to become an Associate in three easy steps.

Step One: Find a PayPage
Use the Search box to the left to find PayPages to become an Associate. Search by name (example: Humane Society) or description (example: animal welfare) and optionally limit your search to a city or state. Choose a PayPage from the search results list.

Step Two: Install a Paybox on Your Website
The PayPage you're hosting offers one or more links. Choose the one that best suits your website. Based on your choice, we'll give you a few lines of HTML code (which includes the image link) to cut and paste into your site. Unsure how?

Step Three: Make Money.
Every time a visitor to your website clicks on a hosted paybox and makes a payment, you earn a commission. Learn more.

FIG. 13 amazon.com 🛒 | (YOUR ACCOUNT) | HELP

SEARCH

Search for PayPages to Associate with. Fill in Name or Description and click Go!

Name or Description:

[Animal Society] [GO]

City: (optional)

[            ]

State: (optional)

[            ]

There are 4 results for Animal Society

These people or organizations have PayPages matching your search query. Click a PayPage link to see the page as your website's visitors will see it when they click to pay. Click a paybox link to see the corresponding payboxes and choose which to install on your website.

1. The Animal Society in Pittsburgh, PA
The Pittsburgh Animal Society uses your donations to shelter hundreds of...
PayPage | Payboxes 2. The Animal Society in Seattle, WA
Your donations are used to feed and shelter hundreds of animals in the Seattle...
PayPage | Payboxes 3. The Animal Society in Los Angeles, CA
Your donations are used to feed and shelter hundreds of animals in the LA...
PayPage | No payboxes available at this time.

4. The Animal Society in Hingham, MA
Your donations are used to feed and shelter hundreds of animals in the Hingham...
PayPage | Payboxes

① PAGE REQUEST

② HTML DOC. WITH REFERENCE TO PAY BOX GRAPHIC

③ PAY BOX GRAPHIC REQUEST PLUS COOKIE

④ GENERATE 1-CLICK VERSION OF PAY BOX GRAPHIC

⑤ 1-CLICK PAY BOX GRAPHIC

⑥ REQUEST GENERATED FROM SELECTION OF GRAPHIC (PLUS COOKIE)

⑦ EXECUTE TRANSACTION USING 1-CLICK SETTINGS

⑧ REDIRECT BROWSER DIRECTLY TO "THANK YOU" URL

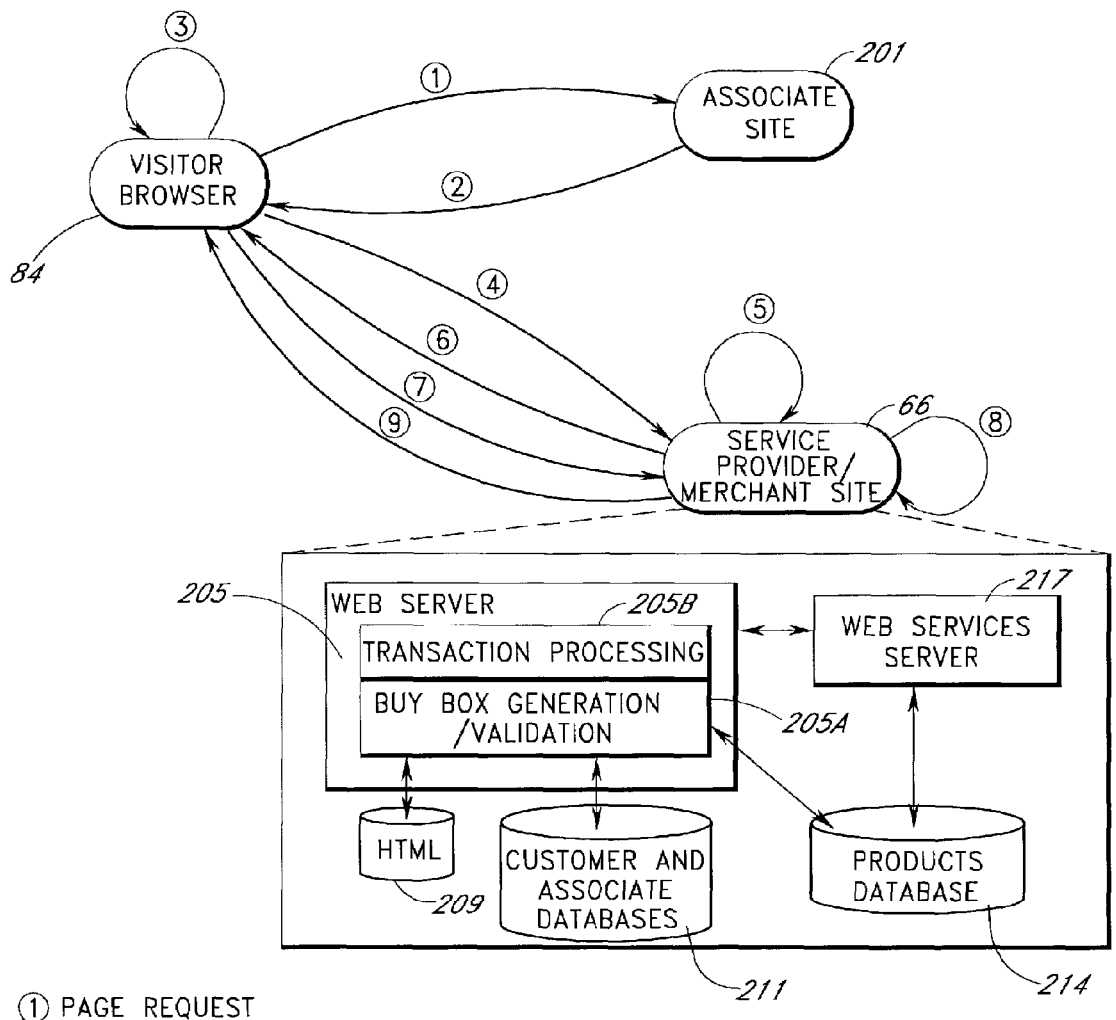

① PAGE REQUEST
② HTML DOCUMENT CONTAINING BUY FROM AMAZON.COM BUTTON
③ USER SELECTS "BUY" BUTTON
④ BUY BOX REQUEST PLUS COOKIE(CONTAINS PRODUCT ID, ASSOCIATE ID, USER INFORMATION)
⑤ GENERATE BUY BOX; CREATE FIRST AUTHENTICATION TOKEN USING PRODUCT ID, ASSOCIATE ID, USER ID
⑥ BUY BOX POP-UP WINDOW (CONTAINS AUTHENTICATION TOKEN)
⑦ PURCHASE REQUEST GENERATED BY SELECTION OF 1-CLICK
    INCLUDING PRODUCT ID, ASSOCIATE ID,
    USER INFORMATION AND AUTHENTICATION TOKEN
⑧ CREATE SECOND AUTHENTICATION TOKEN FROM TRANSMITTED INFORMATION; COMPARE TO FIRST AUTHENTICATION TOKEN; EXECUTE TRANSACTION
    USING 1-CLICK SETTINGS
⑨ REDIRECT POP-UP WINDOW TO "THANK YOU" PAGE

*FIG.22*

DETECTION OF FRAUDULENT ATTEMPTS TO INITIATE TRANSACTIONS USING MODIFIED DISPLAY OBJECTS

FIELD OF THE INVENTION

The present invention relates to user interfaces and methods for allowing users to initiate transactions, including item purchases, during browsing of third party web sites (including web sites of associates), and for detecting and inhibiting transactions that are potentially fraudulent.

BACKGROUND OF THE INVENTION

1. Payment Services

Various web-based services have been developed for allowing users to collect payments from other users. These services generally suffer from a number of deficiencies. One such deficiency is that the payer typically must complete a significant number of setup steps before making a payment to a new payee. As a result, existing services are not well suited for allowing payees to collect small or one-time payments from large numbers of users. The need to collect such payments may arise, for example, when an author, musical artist, or other content creator wishes to solicit contributions from consumers of downloadable content; or when a charitable organization wishes to solicit online donations from the public.

Another deficiency is that many existing payment services do not provide a simple mechanism for web site operators to integrate the collection process into their own web sites. As a result, prior art payment services are not well suited for small web site operators to solicit and collect payments via their own web sites. Such a need may arise, for example, when an operator of a web site wishes to receive payments from consumers of content hosted by that site. Another deficiency is that existing payment services do not provide an adequate mechanism for payees to enlist other web site operators to assist in the collection process.

2. Associates Programs

Many online merchants offer programs whereby independent web site operators can provide links from there respective web sites to a merchant's web site, and receive some form of compensation for resulting customer referrals. The compensation may, for example, be in the form of bounty payments or commissions on resulting sales. The entities that participate in such programs, commonly referred to as "associates" or "affiliates," may include individuals and businesses capable of providing well-respected recommendations and editorials of products or other items sold by the online merchant. For instance, if the online merchant sells books, a well known chef may set up an associate web site that includes recommendations of cookbooks, while a software company may set up an associate web site that includes recommendations of books about the company's software products.

Each link from an associate web site to the merchant web site typically includes a unique associate ID, which may be encoded in the URL that points to the merchant's site. When a customer follows such a link, the merchant's web site records the associate ID contained in the associated page request so that the associate can be properly credited for the referral. If the link is provided in association with a description of a particular product, the link may also be encoded with a corresponding product ID. One example of a system for implementing an associates program is described in U.S. Pat. No. 6,029,141.

Associates programs provide users with more ways to learn about products they wish to purchase, while providing the merchant with a way to reach more customers. One problem with these programs, however, is that the customer typically must exit the associate's web site in order to complete the purchase of an item selected from that web site. In addition to being inconvenient to customers, this drawback may deter some web site operators from ever becoming an associate. The present invention addresses this deficiency, while providing a mechanism for reducing the possibility of fraudulent transactions.

SUMMARY OF THE INVENTION

The present invention addresses the above and other problems by providing various inventive features associated with user-to-user payments and item purchases. These features may be implemented individually, or in an appropriate combination, within a given payment service. The payment service may be implemented through a web site of a payment service provider. (As used herein, the term "web" refers generally to a navigation interface in which users navigate between pages or documents using hyperlinks; and "web site" refers generally to a networked server system that supports such a navigational interface.)

One feature of the invention involves the use of customizable, payee-specific pay pages for receiving payments. In one embodiment, each user of the service can set up, through a set of pay page configuration pages of the service provider site, one or more pay pages for receiving payments from other users. The pay pages may be customized by the payee with textual and graphical content describing the payee and/or the purpose of the pay page. For example, a content creator may create a pay page for collecting honor system payments from users who download a work, in which case the pay page may describe the content creator and/or the work. The payee may also specify certain parameters or behaviors of the pay page, such as minimum and suggested payment amounts. Other users may visit the pay page to make credit card or other payments to the payee. In one embodiment, users (payers) can set up and enable a 1-Click™ option and thereafter make pay page payments to others with a single action, such as a mouse click.

Another feature of the invention involves the use of pay page templates to allow users to set up customized pay pages for a variety of payment scenarios. Each template preferably specifies the display elements and behavior of a pay page. Templates may be provided by the service provider for a variety of payment scenarios, including but not limited to general purpose payments, honor system payments, tipping, required payments, charities, auctions, invoicing, and events.

Another feature involves the use of pay boxes to allow payers to initiate pay page payments from the web sites of the payees and/or third parties. Each pay box serves as a link to a corresponding pay page, and may appear as a banner-type graphic image (or another type of display object) within the host page. Each instance of a pay box may specify one or more pay page parameters that may be preset or passed by URL (Uniform Resource Locator), such as a suggested payment amount, pay page color, or a textual description.

In a preferred embodiment, the pay box images are served by the service provider site, and are customized for recognized users of the service (e.g., by displaying the user's name). Selection of the pay box causes the user's browser to retrieve the corresponding pay page (customized according to any parameters passed), or in some embodiments, causes the payment to be made as a single-action transaction. Using this feature, web site operators can solicit payments on their own web sites while using the service provider to collect resulting payments. In addition, the web site operators can customize the messaging payers see during and following the payment process.

Another feature involves serving personalized display objects, such as personalized pay box images or buy boxes, within pages of external web sites (web sites that are separate and distinct from the service provider site). In one embodiment, a reference to the display object is incorporated into the coding of an external web page to cause a visitor's browser to request the display object from the service provider site. Upon receiving such a request from a recognized user/browser, the service provider site personalizes the content of the display object for the particular user, and returns the personalized object for display within the web page. The display object may be personalized, for example, by displaying one or more of the following types of information: (a) the user's name; (b) a portion of the user's credit card number; (c) an indication that selection of the object will cause a particular payee to be paid a particular amount; (d) personal recommendations of products and/or services; (e) links to related content, (f) a payment confirmation message. An important aspect of this feature is that the personalized content is provided within external web pages without exposing such content—or other personal information of users—to the external web site or its operator.

Another feature of the invention is a pay page associates program in which users of the service can host pay boxes or other payment links of other users—preferably in exchange for commissions, bounty payments, or other compensation for resulting referrals. In one embodiment, a payee (pay page owner) can associate-enable a pay page and set up one or more corresponding pay boxes for others to host. Other users may thereafter install these pay boxes on their web sites and earn commissions on referrals that result in payments. Using this feature, users can, for example, raise money for (by hosting pay boxes of) their favorite charities. In addition, an author, musical artist, or other content creator can allow other users to republish a downloadable work under the condition that the content creator's pay box is displayed in conjunction with the work.

Another feature involves a service for users to send customized payment requests to other users. To send a payment request, the payee preferably creates or selects an existing pay page and then specifies how the page should be displayed to the payer. For example, an auction seller may specify the item name, winning bid, tax, and shipping amounts to be displayed within the pay page. The service then sends an email to the payment request recipient(s) containing a link to the pay page. The URL portion of this link preferably includes parameters specifying how the page should be displayed. This feature may be used, for example, for sending custom invoices to purchasers, and for collecting membership dues and event-related contributions from small groups of users.

Another feature involves the provision of single-action payment links within external web pages to allow users to access, and make payments for, items of content. For example, a content provider site may include a payment link for allowing users to access and pay for a particular article. When a recognized 1-Click user selects this link, the SP site charges the account of the visitor (typically a small payment in the range of 5 to 50 cents), and redirects the visitor's browser to the content provider page containing the content. This content page may include one or more display objects served by the service provider site, such as a bar displaying a payment confirmation message. Multiple payments made by the same user may be aggregated for purposes of charging the user's credit card.

Another feature, which is particularly applicable to merchants that have associates programs, involves a service for allowing users to purchase items from the service provider/merchant during browsing of web sites of associates. In one embodiment, the service makes use of a buy box served by the merchant's web site for display within, or in conjunction with, a page of an associate's web site. As with the pay boxes described in preceding sections, the buy box may be personalized for the particular customer (e.g., with the customer's name, credit card information, shipping information, etc.), without exposing the customer's information to the corresponding associate. For recognized customers that have enabled 1-Click purchasing on the merchant's web site, the buy box preferably includes a button or other link for purchasing the item as a 1-Click transaction. To inhibit fraudulent 1-Click transactions, the merchant/service provider site encodes within each instance of the buy box information that may later be used to confirm the authenticity of corresponding 1-Click transactions. In one embodiment, the encoded information is used to confirm that a 1-Click purchase request that purports to correspond to a particular item, user, and associate actually corresponds to a buy box that was previously rendered for that item, user and associate.

Another aspect of the invention involves methods for detecting and inhibiting fraudulent transactions initiated by users while browsing web sites of associates or other third parties. In one embodiment, a merchant web site serves a display object for display within, or in association with, a web page of an associate. The display object is encoded such that, when a user selects a link associated with the display object, the user's browser transmits a transaction request that includes a token, and also includes identifiers of the user (e.g., a cookie), the associate, and an item. A transaction validation system validates the transaction request by determining whether the token included in the transaction request corresponds to the user, associate, and item identifiers used to generate the display object. Different embodiments of the invention contemplate numerous possible forms for tokens, thus a token is not limited to any particular form. For example, tokens may contain numerical values or textual strings generated from identifiers, may contain randomly-generated values, may encode data, or may contain a combination of forms.

The various features of the invention may be implemented within conventional web sites that are based on HTML (Hypertext Markup Language), and may also be implemented within web sites that use HDML (Handheld Device Markup Language), XML (Extensible Markup Language), and other coding conventions.

BRIEF DESCRIPTION OF THE DRAWINGS

A computer-implemented sales service that embodies the above and other inventive features will now be described with reference to the following drawings:

FIGS. 5-12 illustrate example web pages showing how users manage pay pages and pay boxes through the service provider site.

FIGS. 13-16 illustrate example web pages showing how users can locate and install pay boxes of other users to become pay page associates.

FIGS. 17-19 are screen displays illustrating a feature through which users can request payments from other users via customized versions of existing pay pages.

FIG. 22 illustrates a method by which customers of a merchant/service provider may make 1-Click purchases while browsing associate web sites.

DETAILED DESCRIPTION OF THE PREFERRED EMBODIMENT

Figure 1:
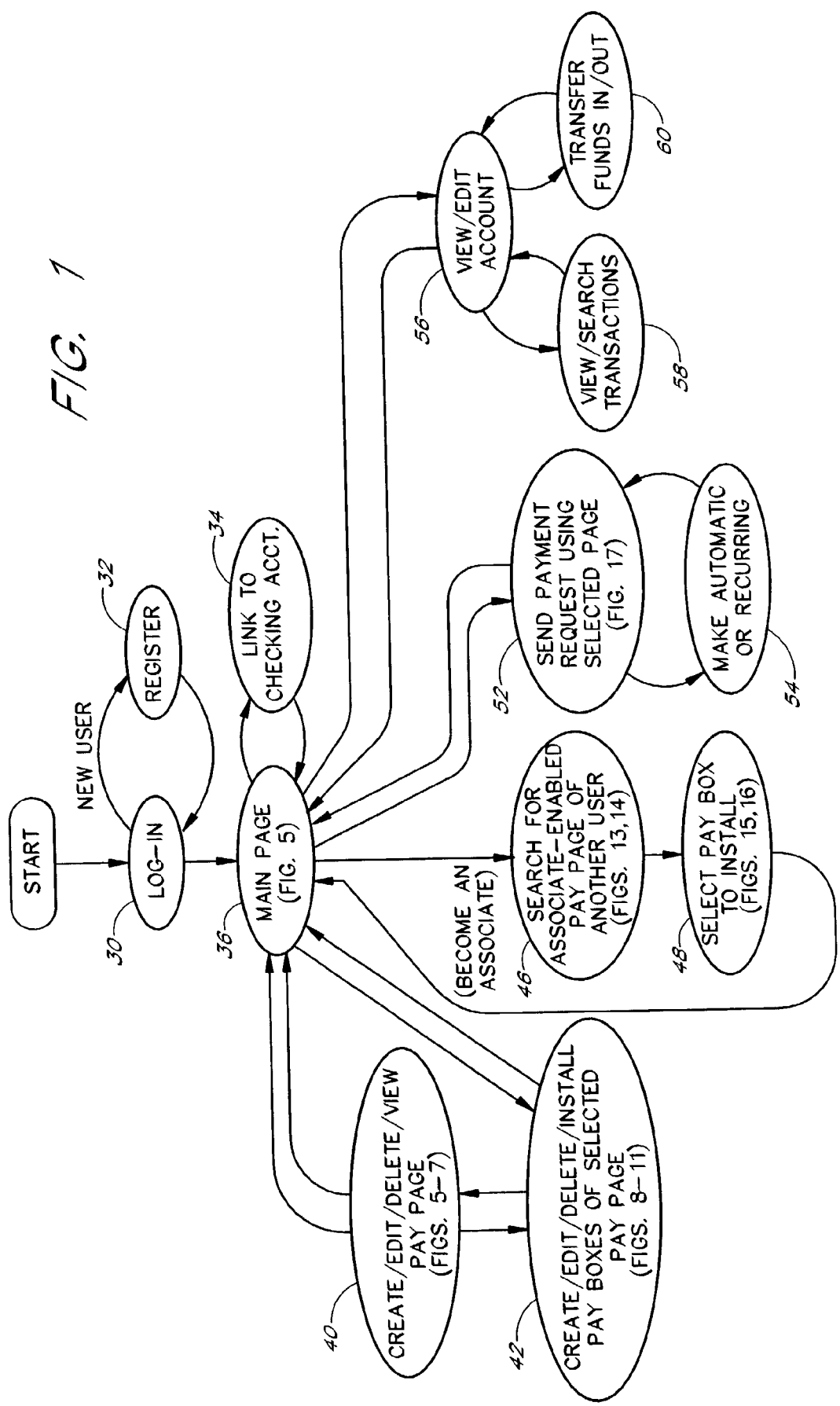
FIG. 1 illustrates an overall process flow through which users register with the payment service, manage pay pages, and perform various related actions using a service provider site.

A computer-implemented payment service that embodies the various inventive features will now be described with reference to the drawings. The service is hosted by a service provider site (also referred to generally as "the system"), which comprises an HTML-based World Wide Web site in the illustrated embodiment. As will be recognized, the service and its various features may also be implemented within other types of web sites and server systems, including but not limited to systems that provide wireless browsing capabilities. The various service functions described herein are preferably implemented within software executed by one or more general-purpose computers, but could be implemented using other types of computing devices.

As will be apparent, the various inventive features of the service may be implemented differently than described herein. Further, the service may be implemented with only a subset of the disclosed features, and/or with additional features that are not disclosed. The following description is thus intended to illustrate, and not limit, the invention. The scope of the invention is defined by the appended claims.

The description of the payment service is arranged within the following sections and subsections:

I. Terminology
II. Overview of Payment Service
   A. General Process Flow
   B. System Components
   C. Pay Page Transaction Processing
III. Example Pages and Page Flows
   A. Management of Pay Pages and Pay Boxes
   B. Associate Hosting of Pay Boxes
   C. Sending a Payment Request
IV. Pay Page Templates and Parameters
V. Pay Boxes and SP-Generated Display Objects
VI. Pay Box Tracking and Feedback Reports
VII. 1-Click Payments from External Sites
VIII. Validation of Transactions initiated from Third Party Sites
   A. Purchases initiated while browsing Associates Web Sites
   B. Additional Token-Based Transaction Validation Methods
   C. Validation of Other Types of Transactions
IX. Payer Preferences for Treatment on External Sites I. Terminology The following terms will be used throughout the description of the payment service:

Pay page—A custom page or screen through which an associated user (the "payee" or pay page "owner") can receive payments from other users. Typically, a pay page includes information about its owner. Pay pages are persistent, meaning that a given pay page may be used to receive many separate payments over time (from the same or different users). In one embodiment, payees can create pay pages for a variety of different types of payment scenarios (using corresponding pay page templates), such as general-purpose payments, charitable donations, and invoice payments.

Service provider or "SP"—Generally, the business entity (or combination of related entities) that operates the payment service. In the context of the disclosed service for allowing users to purchase items during browsing of associate web sites (section VIII), the term is also used to refer to a merchant or other entity that provides this service.

Service provider site (or SP site)—A networked computer system, such as a web-based server system, that implements the payment service and/or other services. This system may be accessible through a single or multiple Internet domain names, and may include computers that are geographically remote from one another. In the sample screen displays, the SP site includes the amazon.com web site. In one embodiment, the SP site also hosts or is linked to other types of e-commerce services, such as retail sales, music download, and online auction services. Sites or pages that are separate and distinct from the SP site are referred to as being "external." In the illustrated embodiments, it may be assumed that all external sites are hosted by computers that are outside the control of the SP, and that such sites are controlled by business entitles other than the SP.

Pay box—A display object that may be incorporated into a page to provide functionality for viewers of that page to initiate payments to a pre-specified recipient. In the preferred embodiment, each pay box includes a graphical image served by the SP site and provides a link to a corresponding pay page. In one implementation, pay boxes that point to a particular pay page may be installed within a web site of the pay page owner ("second party sites") and/or web sites of third parties ("third party sites" or "associate sites"). Pay boxes may optionally specify pay page parameters, such as a suggested payment amount.

Pay box graphic (or "pay box image")—The graphical image portion of a pay box (e.g., a GIF or JPEG file). When a user views a page having a pay box installed therein, the user's browser requests the pay box graphic from the service provider (SP) site. In one embodiment, if the user is recognized by the SP site this graphic is customized for the particular user (e.g., by incorporating the user's name into the graphic). The graphic may, but need not, be similar in size and appearance to conventional banner ad graphics. A textual link, button, icon, or another type of content (Flash, Shockwave, etc.), may alternatively be used.

Buy box—A display object, such as but not limited to an HTML form, that provides functionality for customers to purchase items. In one embodiment, the buy box corresponds to a single item to be purchased and is provided as a "pop-up" web page. In other embodiments, buy boxes may be embedded in associate web pages (e.g., as GIF images or frames), or may appear when a customer hovers a pointer or cursor over a particular place on the associate web page. Buy boxes may contain information about the product being offered, and, depending on the implementation, may utilize or display personal information about the viewer in order to offer services geared toward that viewer, such as 1-Click shopping.

Buy box button—A display object that contains a reference to a buy box so that, when the visitor clicks on the button, the visitor's web browser follows the reference and displays a buy box. In some embodiments, clicking on the button may cause the buy box to open in a new browser window, while in alternative embodiments, the web page may employ a script or program to change the button into the buy box when the button is selected or the mouse pointer is hovered over it.

Associate—In the context of pay pages, a web site owner or operator that hosts (displays) a pay box or other link to a pay page of another user, potentially in exchange for commissions or other compensation for resulting referrals. For example, a music download site may host pay boxes of the associated artists to allow users to make voluntary or mandatory payments to the artists; the operator of the music download site (associate) may receive commissions on such payments. The use of third party web sites to display pay boxes is also referred to as "pay box syndication." The term "associate" is also used herein to refer to a participant in a merchant's affiliate marketing program, wherein users (associates) may refer customers to a merchant's web site in return for some form of compensation.

1-Click—A service which allows a customer to complete a transaction with a single action, such as a single mouse click, using pre-specified information. One implementation of such a service is described in U.S. Pat. No. 5,960,411, the disclosure of which is hereby incorporated by reference. In some implementations, the 1-Click feature allows the purchaser to choose from a list of pre-specified addresses or recipients. One implementation of this feature is described in U.S. patent application Ser. No. 09/547,540, filed 12 Apr. 2000, the disclosure of which is hereby incorporated by reference.

I. Overview of Payment Service

The payment service preferably provides functionality for users to receive payments from other users via payee-customized pay pages. In one embodiment, once a user has set up an account with the SP, a default pay page is automatically created for that user. In another embodiment, pay pages exist only for those users who have actively created a pay page. In either case, each user can preferably have more than one pay page. For example, a musical group may create a separate pay page for each work it has posted in digital form (see FIG. 7), and may use these pay pages to collect voluntary payments, such as tips, from users that download such works. Further, an individual may create one pay page for personal use and another for business use.

In a preferred embodiment, each pay page is based on a template that specifies the layout and the behavior of the pay page. Each template contains default values that can be overridden by the pay page owner during the pay page setup process. Each pay page preferably includes the following "required" information fields or values: (1) a title, (2) an identifier of the pay page "owner" or "payee," (3) a description, and (4) an amount, which can typically be modified by the payer. Additional fields and options may be defined by a particular template. Different templates may be provided for different types of organizations, such as charitable organizations, authors, musical artists, other content providers, and individuals. Further, templates may be provided for specific types of pay page uses, such as tipping, invoicing, auctions, membership dues, rebate requests, and payments required for access to content. The types of elements that may be included within a template in one embodiment are described below in section IV ("Pay Page Templates and Parameters").

Each pay page preferably has a unique URL (Uniform Resource Locator). The URLs of the default pages (if used) are preferably based on a naming convention in which the user's email address is the only variable (e.g., www.paypages.com/<email address>.htm). This allows users to easily locate the default pay pages of other users. An SP-assigned or user-selected nickname may be used in place of the email address. Other types of pay pages may be given encoded URLs that are relatively difficult to identify through trial and error. As discussed below, the service may support a variety of methods for locating and accessing pay pages, including pay boxes and a search engine.

In addition to the payee-specific pay pages, the service may provide a generic "send money" page for sending money to payer-specified recipients.

Although the web sties and pages in the illustrated embodiments use HTML (Hypertext Markup Language) coding, it will be apparent to those skilled in the art that other markup languages could be used. For example, the inventive features could be implemented using web sites and web pages that use HDML (Handheld Device Markup Language), XML (Extensible Markup Language), or another appropriate markup language. In addition, although the use of personal pay pages provides important benefits, it will be recognized that many of the features of the invention can be implemented without requiring payees to have pay pages.

A. General Process Flow (FIG. 1)

Figure 3:
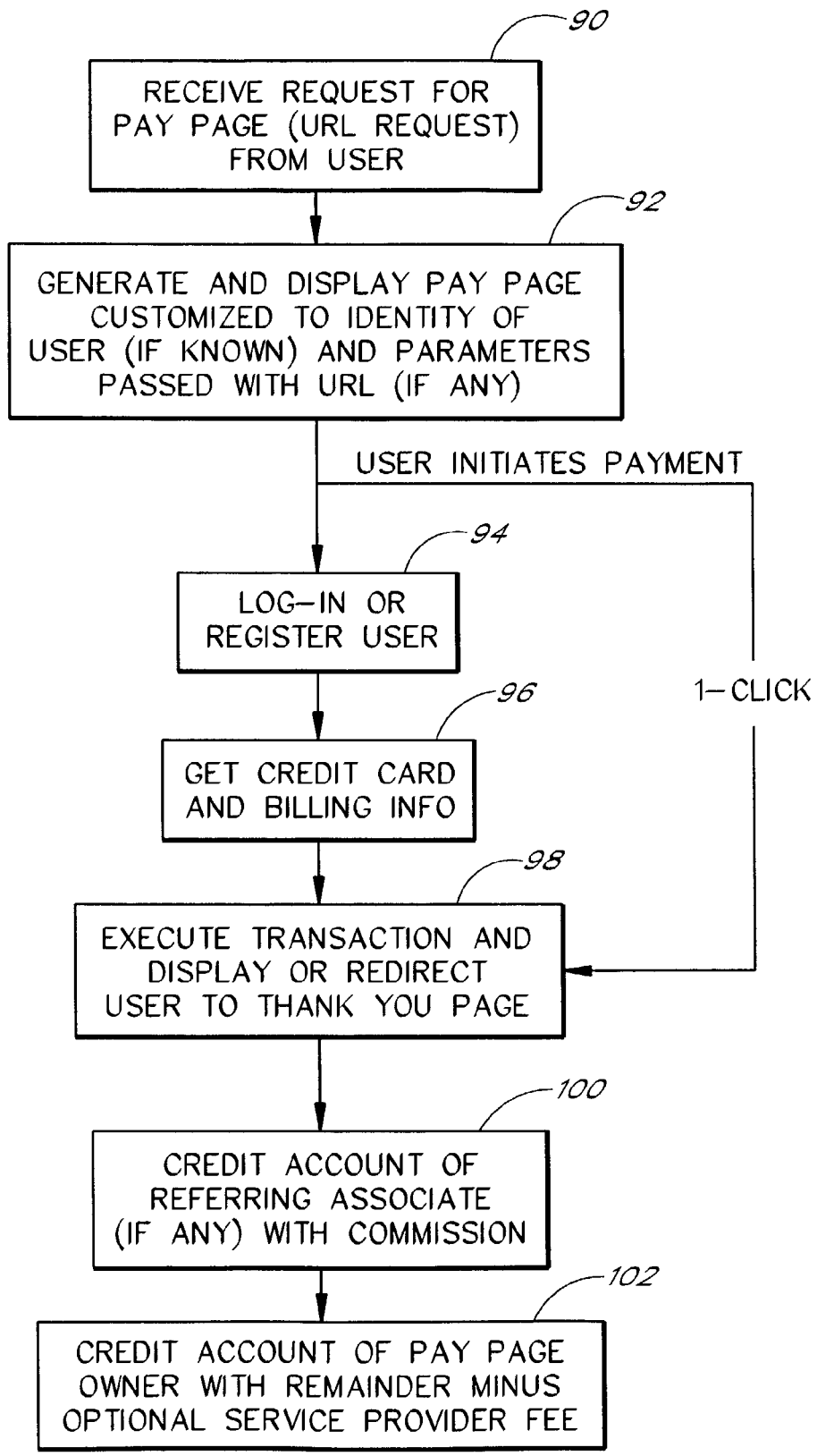
FIG. 3 illustrates the process through which the service provider site displays pay pages and processes pay page transactions.

FIG. 1 illustrates the basic process flow through which users register with the service, manage pay pages, and perform various related actions. Each state within FIG. 1 corresponds generally to one or more pages of the SP web site. As indicated by the figure numbers listed in FIG. 1, examples of some of these web pages are included in subsequent drawings. The process by which users make payments via pay pages is shown in a separate drawing (FIG. 3).

As depicted by the "log-in" state 30, users initially enter the payment service by logging-in with a pre-selected username and password (or other authentication information). New users must initially register with the service (state 32) before they can make or receive payments via pay pages. During the registration process, the user enters various account information such as a name, credit card number, password, and email address. During or following the registration process, the user can also preferably enter settings for, and enable, the system's 1-Click™ service. As discussed below, when the 1-Click service is enabled, the user can make pay page payments with a single mouse click or other single selection action. In one embodiment, users can also make 1-Click payments directly from pay boxes hosted on external web sites. During or following the registration process, the SP site stores a cookie on the user's computer to permit subsequent identification of the user.

As illustrated by state 34, the user may also optionally link the account with the SP to an existing checking account. The bank routing number associated with the checking account may be determined automatically, based on information entered by the user from the face of a check, using the process described in U.S. application Ser. No. 09/517,563, filed Mar. 2, 2000, the disclosure of which is hereby incorporated by reference. Once the pay page account has been linked to a checking account, the user may initiate transfers of funds between the two accounts (state 60).

As depicted by state 36, the service may include a main page (see FIG. 5) or other area from which users can initiate various actions. The main page preferably displays a listing of the user's pay pages (if any), and allows the user to select a particular pay page with which to perform an action. As illustrated by state 40, the user can create a new pay page, and can an edit, view, or delete an existing pay page (see example page flow in FIGS. 5-7, discussed in section III-A below).

As depicted by state 42, the user may also create, edit and delete pay boxes for a particular pay page (see example page flow in FIGS. 8-11, discussed in section III-A below). Once a pay box has been created, the pay page owner (and in some embodiments, other users) can "install" that pay box within one or more external web pages to provide a link to the corresponding pay page. To facilitate this process, the service automatically generates a sequence of HTML (Hypertext Markup Language) coding to be added to the host web page (see FIGS. 10 and 16, discussed below). This HTML coding includes a reference to the pay box image (hosted by the SP site), such that the image is automatically requested from the SP site when the page is displayed by a browser. The coding may alternatively be generated according to another markup language or link coding convention. For example, in a wireless environment, the appropriate HDML (Handheld Device Markup Language) coding may be generated. Further, the payment service may generate coding for installing other types of links (e.g., textual) to pay pages.

One particular application for the pay box feature is to provide a mechanism for compensating creators of digital content. For example, a content creator such as a musical group, author, or web site operator could install a pay box on its own (second party) web site to solicit voluntary or mandatory payments from users. Users who access the content can then click through the pay box to make voluntary or required payments to the content creator. The amount of this payment (e.g., $1 per download) may be suggested by the pay box, in which case this amount is preferably displayed within the pay page when the user clicks through (as described below). Where the payments are "required," an appropriate mechanism may be used to prevent access to the content until the user has paid.

One variation of this model is for the SP itself to provide a forum for content creators to post their works in a downloadable form. The posted works could then be displayed (e.g., on product detail pages) in conjunction with pay boxes for soliciting voluntary (or mandatory) payments. With this model, any user (regardless of whether it operates a web site) could post a work on the SP site and use the payment service to collect payments from users. For example, a relatively unknown musical group could post a song or album in MP3 format together with a pay box requesting a voluntary payment of $1 per download.

In one embodiment of the payment service, during the pay page creation or editing process (state 40) the user may "associate-enable" a particular pay page. Once a pay page has been associate-enabled, other users may install one or more of that pay page's pay boxes within their own web pages—optionally in exchange for commissions or other compensation for resulting referrals. For example, a charitable organization such as the Red Cross may associate-enable its pay page and create one or more pay boxes for that page. Other users (associates) may then install these pay boxes on their own web sites to provide a mechanism for others to locate the Red Cross pay page. When a user (a) follows (clicks through) such a pay box and then makes a payment on the corresponding pay page, or (b) where applicable, makes a 1-Click payment from the pay box, the associate who generated the referral may be given a portion of that payment.

To become a pay page associate, the user initially searches for or otherwise navigates to a desired associate-enabled pay page (state 46). A search engine may be provided for this purpose. The user then selects a corresponding pay box (or optionally another type of link to a pay page), and installs the pay box on one or more third party sites (state 48). This process is illustrated by the example page flow of FIGS. 13-16, discussed in section III-B below.

One particular application for the associate feature is to provide a mechanism for compensating distributors of digital content. A third party (associate) distributor of digital content (e.g., a music or e-book download site) could display the pay boxes of artists, authors or other content creators together with the associated content. When users click through such pay boxes and make voluntary payments to the content creators, the third party associate may be given a portion of each payment as compensation for distributing the content. Another specific application is to allow web site operators to raise money for their favorite charities while receiving commissions.

As illustrated by state 52, the system may also permit users to generate and send payment requests to other users. To initiate a payment request, the payee-user specifies the email address(es) of one or more recipients, and enters pay page customization data specifying how the payee's pay page should be displayed to such recipients. This customization data may include, for example, a requested payment amount and an associated textual description. The system responds to initiation of the payment request by sending an email to each recipient with a URL-encoded link to the pay page. The URL portion of this link includes parameters that are used by the SP web site to determine how to display the page. This feature of the system may be used, for example, to send customized invoices to other users. Other example applications for this feature are described below in section III-C ("Sending a Payment Request").

As depicted by state 54, the service may also provide an option to set up an automated payment request or a recurring payment request. An automated payment request may be used, for example, by an online auction seller to automatically send invoices (links to customized pay pages) to winning bidders. Such a pay page may automatically be populated with the picture and description, of the auction item (as displayed within the corresponding auction page) and the dollar amount of the winning bid. A recurring payment request may be used to collect any type of recurring payment, such as subscription fees or group membership fees.

Finally, as depicted generally by states 56-60, the service may provide various account management pages. From these pages, the user may perform such actions as viewing pay page transactions (both payee and payer), transferring funds into and out of the account, and updating a user profile. The service may also generate, send and retain transaction receipts, and may provide reporting for tax purposes (e.g., for payments to charitable organizations).

B. System Components (FIG. 2)

Figure 2:
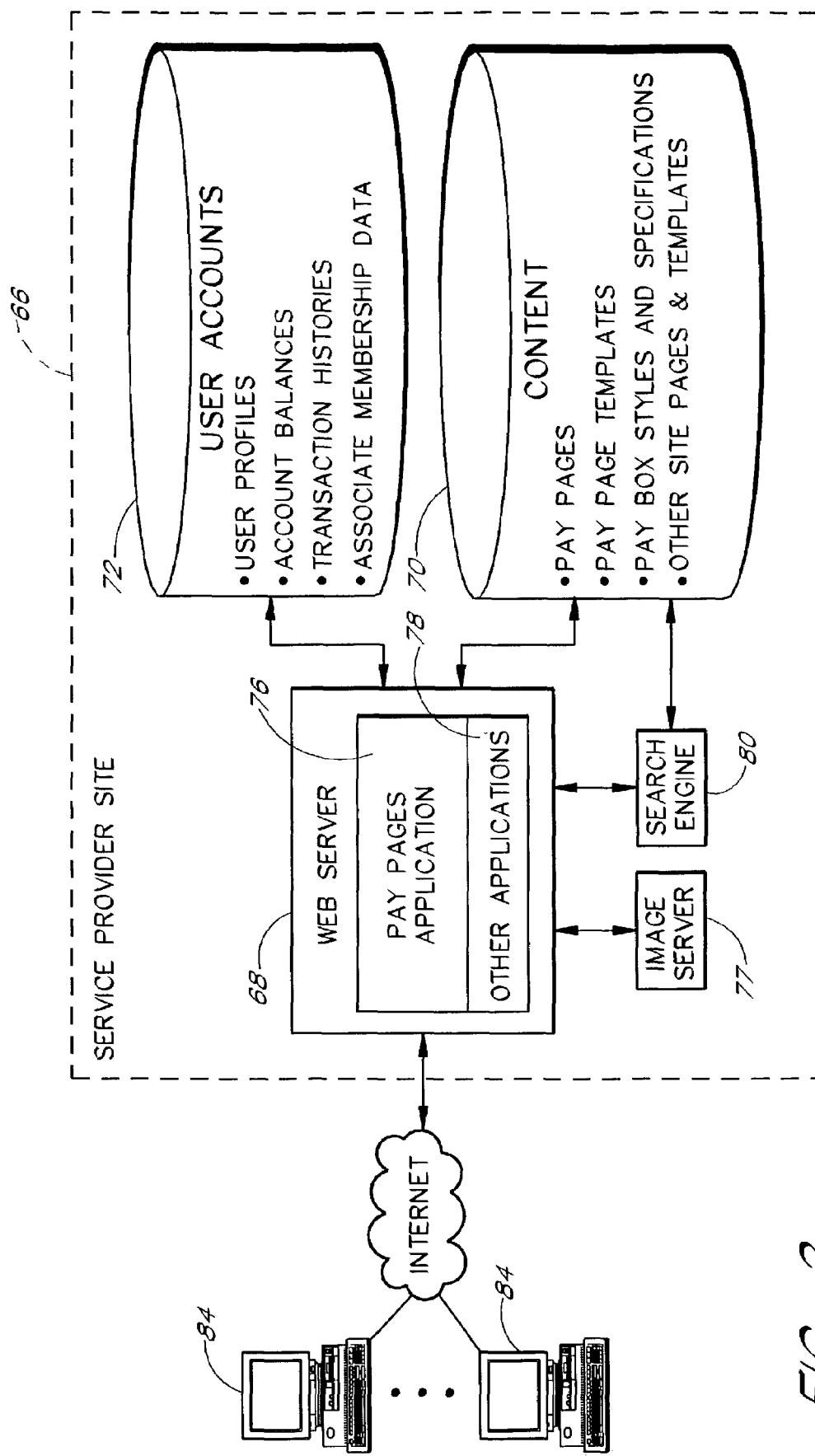
FIG. 2 illustrates the basic web site components used to implement the payment service.

FIG. 2 illustrates a set of components that may be used to implement the payment service on the SP site 66. The system includes a web server 68 which accesses a content database 70 and a user accounts database 72. The system may also include databases for storing other types of information, such as a products database and an auction database (not shown).

The web server 68 includes a pay pages application 76 which embodies the various pay page related functions described herein. The pay pages application includes or makes use of modules for performing some or all of the following tasks or services: (a) identification of return visitors to the SP site using cookies, (b) generation of customized pay pages and pay boxes according to settings specified by payees, (c) display of the pay pages to visitors, customized according to any parameters passed with page request and customized with visitor names/1-Click settings, (d) processing of payment transactions, including tracking and crediting associates for referrals and sending "thank you" emails to payers, (e) generation of HTML or other coding for installing pay boxes, or other links to pay pages, within external pages, (f) user browsing of associate-enabled pay pages and their associated pay boxes, (g) generation of payment requests, and (h) user viewing and updating of pay page account information. Each module preferably includes executable code, and where applicable, includes web pages for interacting with users. Other functions and services that may be implemented by the pay pages application are described below.

As illustrated, web server 68 communicates with an image server 77 that dynamically generates and serves pay box graphics (and possibly other types of images) for display within external web pages. Another type of object server, such as a server of animation objects or other executable display objects, could alternatively be used. In one embodiment, the pay pages application 76 and the image server 77 recognize different browser capabilities (HDML, wireless, WAP, etc.) and device types, and select the pay pages and pay boxes to display accordingly.

The web server may also include applications 78 for implementing other types of services such as a retail sales service and one or more person-to-person sales services. The various applications 76, 78 may share code modules for implementing common tasks such as registration, user authentication, and credit card processing.

The web server also preferably communicates with a search engine 80 for searching the various areas of the site. Using this search engine, users can search for pay pages of other users based on user name and other criteria. As mentioned above and illustrated in FIG. 12, users can run searches specifically for pay pages that are associate-enabled.

As depicted in FIG. 2, the content database 70 includes the pay pages created by users, and includes pay page templates that may be used to generate page pages. As mentioned above, different templates may be provided for different payment-related scenarios. The templates are preferably created by the service provider, although the service could provide functionality for payees to create their own templates. The content database also includes web pages and templates for the various other areas of the site.

The content database 70 may also include the descriptions of pay box styles made available by the SP, and specifications of pay boxes that have been defined by pay page owners. The specification of a pay box may indicate, for example, the pay box style, color, suggested payment amount, textual message, and greeting format (see FIGS. 8 and 9). Some or all of these pay box parameters may alternatively be encoded within pay box identifiers passed by URL. As described below, the image server 77 uses the pay box specifications to dynamically generate and serve pay box graphics (e.g., GIF images) to user computers 84. The pay box graphic may also be customized to include the name and other information about the visitor, if known.

In embodiments in which the SP site allows users to post and receive voluntary payments for digital works (as described above), the content database may also include copies of such works (not shown). These works may be located using the site's search engine or any other suitable navigation interface.

As further illustrated in FIG. 2, the user accounts database 72 stores account-specific information about users of the site. For each user, this information preferably includes a user profile (name, credit card number, 1-Click settings, etc.), an account balance, a history of transactions (including incoming and outgoing pay page payments), and information about any pay page associate relationships the user has created.

Figure 4:
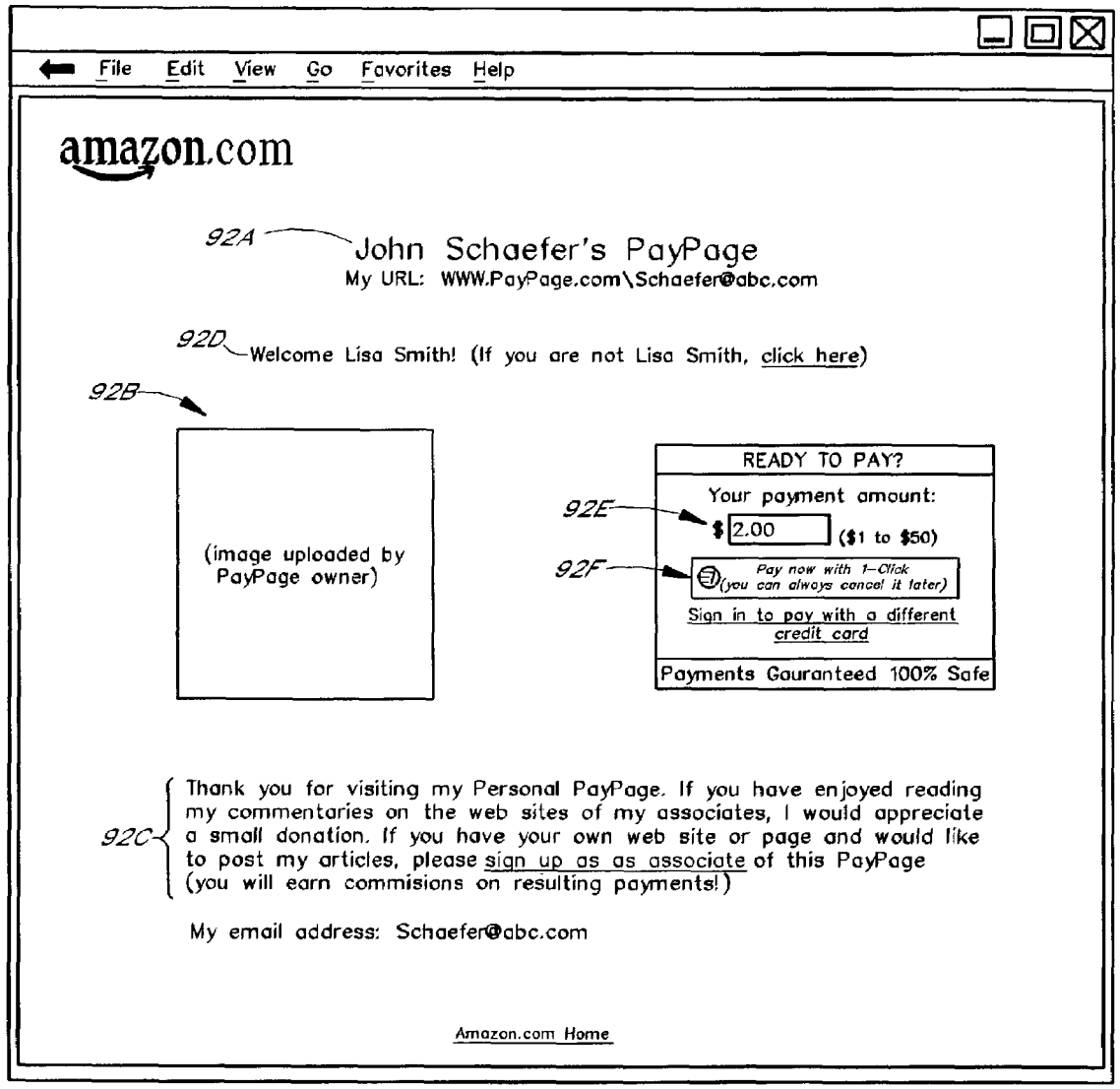
FIG. 4 illustrates an example pay page.

C. Pay Page Transaction Processing (FIGS. 3 and 4)

FIG. 3 illustrates the basic process by which the SP web site 66 displays pay pages, and processes pay page transactions, via the pay pages application 76. As depicted by block 90, the web site initially receives a URL request from a user/computer 84 for a particular pay page. If the URL request resulted from user selection of pay box, the URL may include one or more parameters that override the default values of the pay page. For example, if the pay box specifies a suggested payment amount, this amount is passed via the URL and overrides the default amount displayed within the pay page. Additional details of how parameters may be used are described below in section IV ("Pay Page Templates and Parameters.") If the URL request resulted from selection of a pay box hosted by an associate, the URL also preferably includes a unique identifier of the associate.

If the URL request is from an existing user of the service, the request typically includes a cookie that is used by the system to identify the user. The use of cookies for this purpose is well known in the art.

As depicted by block 92 of FIG. 3, the web site responds to the URL request by generating and returning (displaying) the pay page. An example pay page as seen by the user is shown in FIG. 4. As illustrated, the pay page preferably includes a default or owner-assigned title 92A, a graphic image (logo or photo) 92B uploaded by the pay page owner 92B, and a memo or description 92C entered by the pay page owner. In addition, the pay page includes a greeting message 92D that identifies the visitor by name (if known). If the visitor's identity is unknown, a default message may be used such as "Please sign in."

As further illustrated by FIG. 4, the pay page also includes an "amount" field 92E in which the visitor can enter a payment amount, and a payment button 92F or other link for allowing the visitor to initiate the payment process. In the illustrated example, a suggested payment amount of $2 appears in the amount field 92E. If the visitor is known and has the 1-Click service enabled (as in the FIG. 4 example), the payment button 92F is preferably configured and labeled as a 1-Click button that can be selected to complete the payment transaction. If, on the other hand, the visitor either (a) is unknown, or (b) is known and does not have the 1-Click service enabled, the payment button 92F includes a message such as "Pay Now! (select your credit card)."

As depicted by the "1-Click" path in FIG. 3, if the visitor selects a 1-Click version of the payment link 92C, the system 66 executes the transaction (preferably within a predefined period of time) without requiring any further user action. In addition, the system displays a thank you page (block 98) or redirects the user to an owner-specified page (typically a "thank you" page of the owner's external web site). No additional user action is needed to complete the payment transaction at this point. If, on the other hand, the visitor initiates payment via a non-1-Click link, the visitor may be required to log-in or register and select a credit card before the transaction is executed (blocks 94 and 96).

Although credit cards are used in the illustrated embodiment, any appropriate method for transferring funds between users can be used. In addition, it should be understood throughout the various embodiments described herein that the payer's credit card need not actually be charged at the time of the transaction. For example, in embodiments in which users typically make frequent small payments (e.g., less than $1) for accessing articles or other content, the SP site may aggregate a number of payments for purposes of charging the user's credit card.

As depicted by block 100, if the visitor was referred to the pay page from a pay box displayed within an associate web site, the system may credit the account of the associate-user with a commission. The system could additionally or alternatively be configured to credit the associate's account with a bounty payment (e.g., for each referred user who sets up an account with the SP). Examples of methods that may be used to track referrals from associate web sites and determine associate commissions are described in U.S. Pat. No. 6,029,141, the disclosure of which is hereby incorporated by reference. As depicted by block 102, the SP may extract a transaction fee before crediting the remainder of the payment amount to the payee's account.

As described below in section X ("1-Click Payments from External Sites"), the above-described process may be varied to allow 1-Click visitors to complete the transaction directly from an externally-hosted pay box, such as by simply clicking on the pay box. In such instances, the SP site responds to selection of the pay box by immediately redirecting the visitor's browser to an external URL pre-specified by the pay page owner (or in some embodiments, the associate). Thus, the transaction is completed without requiring the visitor to view the pay page.

The process shown in FIG. 3 may also include appropriate error handling tasks (not show) for processing invalid pay page parameters, invalid pay page entries (e.g., payment amount less than minimum payment amount), and other error conditions.

III. Example Pages and Page Flows

FIG. 5 illustrates an example "main page" of the payment service. This page displays the user's pay page account balance, and lists the pay pages that are currently active within the account. The page also provides links for the user to perform the following types of actions with respect to a selected pay page: edit page, delete page, view page, manage page's pay boxes, and send payment request. The option to send payment requests may be omitted, or may be provided only for certain types of pay pages (e.g., the user's default pay page). The main page also provides links for the user to create a new pay page, become a pay page associate, and access other areas of the site.

A. Management of Pay Pages and Pay Boxes (FIGS. 6-12)

The basic process for creating and managing pay pages and associated pay boxes will now be described with reference to FIGS. 6-11. In this example flow, it is assumed that all pay pages are created using the same template. Where different templates exist for different types of pay pages, a user wishing to create a new pay page may initially be prompted to select the pay page type.

FIG. 6 illustrates the "step one" page of the pay page management process. This page may be accessed by selecting the "Create a New PayPage" button, or one of the "edit" buttons, on the main page (FIG. 5). This "step one" page summarizes the six categories of pay page settings that can be customized, and provides respective "edit" buttons for allowing the user to modify the default settings.

The first category of settings is the messaging associated with the pay page. The messaging includes a pay page description to appear on the pay page, a thank-you message to be displayed to a payer following payment, and a thank you message to be sent by email to the payer. The pay page owner may also be given the option to upload an audio or video clip to be played within the pay page.

The second category is the title and color scheme of the pay page. The color scheme may, for example, be selected to be similar to that of the owner's referring site.

The third category is an optional image to be displayed within the pay page. This may be used, for example, to display a picture of the pay page owner, or to display an image associated with the downloadable content to which the pay page corresponds.

The fourth category is the payment settings of the pay page. These settings include a default payment amount (the amount transferred if the payer does not modify the amount field) and a minimum payment amount.

The fifth category is the advanced settings for the pay page. By editing the advanced settings, the user can specify whether the page is to be associate-enabled, and if so, the commission percentage to be paid for referrals. In addition, the user can specify a location and an email address to be displayed within the pay page, and can specify the URL of a thank you page to be displayed upon completion of the payment process.

The sixth category involves the use of an optional payment counter. This feature can be used to display an optional chart on the pay page. When this feature is enabled, the pay page includes a real time counter indicating an amount received, and/or a number of payments received, via the pay page or an owner-specified set of co-owned pay pages. The counter may optionally be displayed as a goal chart indicating the payment total relative to an owner-specified goal. The payment counter feature may be used, for example, by charities to display real time fundraising data. An example implementation of this feature is described below in section IX titled "Display of Payment Counter Data within Pay Pages."

Figure 7:

When the user finishes customizing the pay page settings, the user can select a "continue" button to access the "step two" page (FIG. 7). In step two, the user previews the pay page, and can either go back to make additional changes or proceed to step 3.

In step three (FIG. 8), the user can select a pay box style to use with the pay page. The user can alternatively return to the main page (FIG. 5) by selecting the "Manage PayPages" link. In the illustrated example, each style corresponds to a particular pay box size. Although rectangular pay boxes are used in this example, pay boxes having other configurations may be used.

In step four (FIG. 9), the user can create a pay box having the previously selected style. Specifically, the user can specify a greeting and message to be displayed in the pay box, and can choose a pay box border color. In addition, the user can specify a suggested payment amount (e.g. $1) for use with the pay box.

Figure 9:
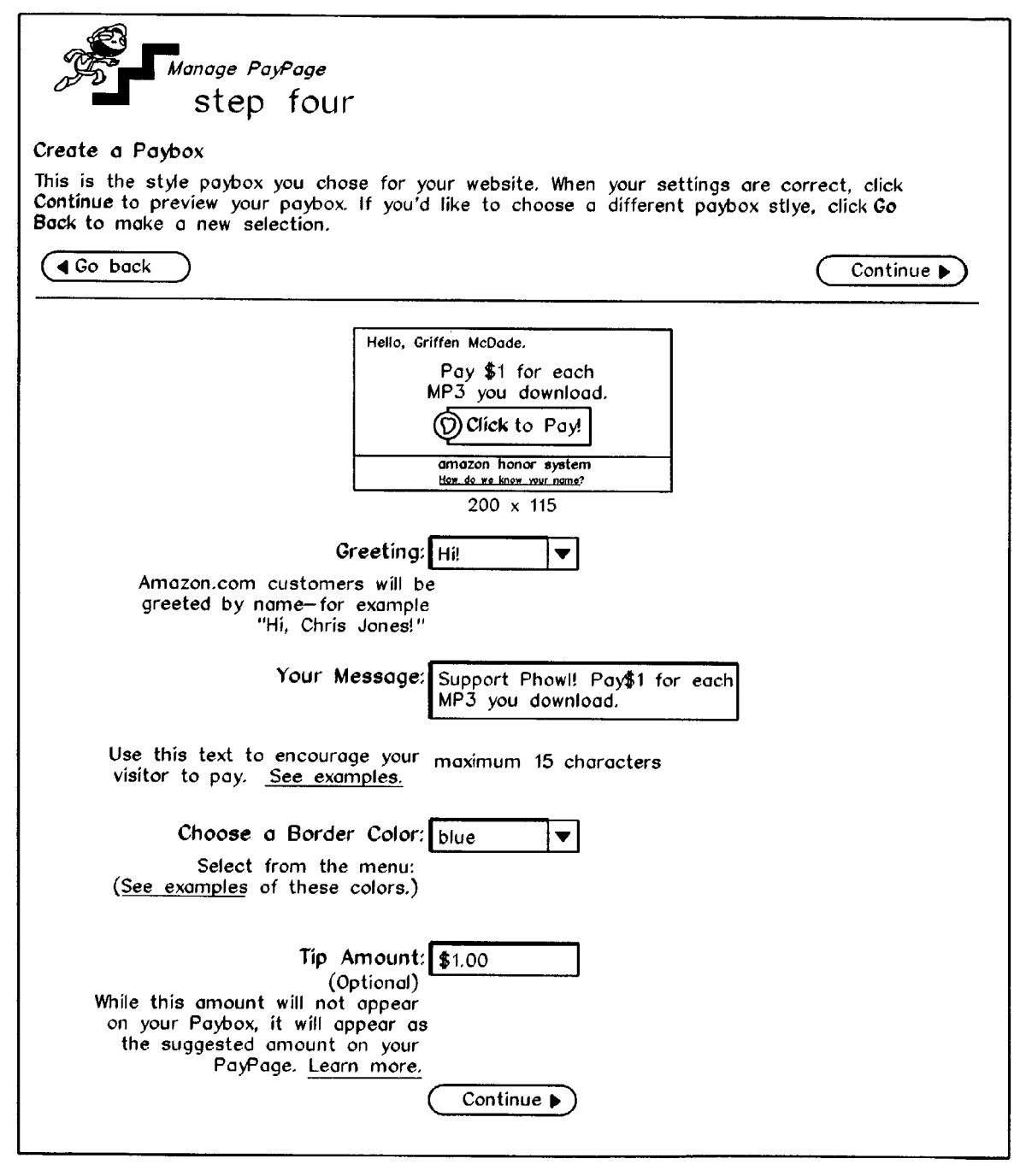

Preferably, when a suggested amount is specified, this amount is passed by URL as a parameter, and is displayed on the pay page when a user accesses the pay page through this pay box. Different pay boxes for the same pay page may have different suggested payment amounts (or other pay page parameters). Although only one type of pay page parameter (payment amount) is shown in FIG. 9, the pay box creator may be prompted to specify other types of parameters, such as pay page display color, other textual fields, etc. In this manner, the pay page can be customized (displayed) differently for different pay boxes. The use of parameters to specify pay page display attributes is described in section IV ("Pay Page Templates and Parameters"). When the user selects the "continue" button to proceed to step five, the pay box settings are stored in the content database 70 for subsequent use.

In step five (FIG. 10), the pay box is displayed to the user together with the HTML code for installing the pay box on a web site. The pay page owner can install the pay box within any number of web pages by copying the block of HTML code into the HTML coding of such web pages. Advanced users can also manually append additional parameters to the pay page URL to control other display attributes of the pay page.

As illustrated in FIG. 10, the HTML code includes a reference to the pay box graphic served by the SP site. Thus, when a user/browser retrieves the HTML document in which the pay box is installed, the browser automatically requests the pay box graphic from the SP site. If the request includes a cookie that allows the SP site to identify the user, the SP site preferably incorporates the identified user's name into the pay box graphic as shown. Selection of the "continue" button of the "step five" page returns the user to the main page (FIG. 5).

As illustrated in FIG. 5, the user can also view and manage the pay boxes associated with a particular pay page by selecting the corresponding link titled "Manage this PayPage's pay boxes." FIG. 11 illustrates an example of the "manage pay boxes" page that appears when this link is selected.

Although the pay boxes shown in the FIGS. 8-11 vary in size and contain textual content, "standard" pay boxes without any textual content may alternatively be used. For example, as described below, standard buttons or icons may be used in which the payment amount is represented by a particular color (e.g., green, blue and red payment buttons represent payments of 5 cents, 10 cents, and 25 cents, respectively). This may be useful, for example, where the pay boxes are used to make small, frequent, 1-Click or other payments from external content provider sites (see section X, "1-Click Payments from External Sites").

Figure 12:

FIG. 12 illustrates a simplified web form that may be used to create pay pages. In this example, the pay page creator can specify a referral commission (percentage) for paying associates.

B. Associate Hosting of Pay Boxes (FIGS. 13-16)

The process of enrolling as a pay page associate involves locating an associate-enabled pay page, selecting a pay box associated with that pay page, and then installing the pay box within one or more web pages. Thereafter, whenever a visitor to such a web page clicks on the pay box and makes a payment, the associate typically receives a commission. A given pay page may have an unlimited number of associates. In addition, a given user may become an associate of multiple different pay pages and pay page owners.

FIG. 13 illustrates a page that may be used to search for associate-enabled pay pages. As illustrated, users can search for pay pages based on one or more of the following: name/description, city, and state. Any of a variety of other navigation tools may be provided for locating associate-enabled pay pages, including browse trees in which the pay pages are arranged by category.

FIG. 14 illustrates an example search results page for the search "name or description=Animal Society." This page lists the matching pay pages, and provides links for viewing the pay pages and their associated pay boxes. Where multiple commission rates are supported, the page may also indicate the commission percentages offered by the owners.

Figure 15:
Figure 16:
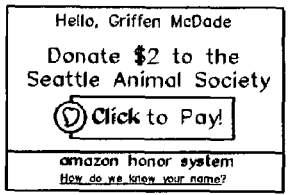

FIG. 15 illustrates an example page listing the pay boxes that have been defined for the pay page titled "The Animal Society in Seattle, Wash." From this page, the user can select the style of the pay box to host. Upon selection of the "continue" button, the SP site returns a page with the selected pay box style and a sequence of HTML for installing the pay box (FIG. 16). This HTML sequence is similar in form to the sequence in FIG. 10, but includes a unique identifier of the associate (assigned by the pay pages application 76 and stored in the accounts database 72) within the URL of the pay box graphic. As described above with reference to FIG. 3, the pay pages application uses this identifier to determine the identity of the referring associate and to keep track of referral events.

In some embodiments, the associate may be given the option (not illustrated) to define pay page parameters to be used with the associate-hosted instance of the pay box. For example, the associate may be permitted to enter a suggested payment amount, an associate name or logo for co-branding the pay page, and/or a post-payment destination URL. Some or all of these parameters may automatically override the owner-specified parameters associated with the pay box.

Figure 18:
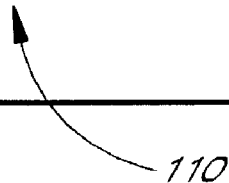
Figure 19:
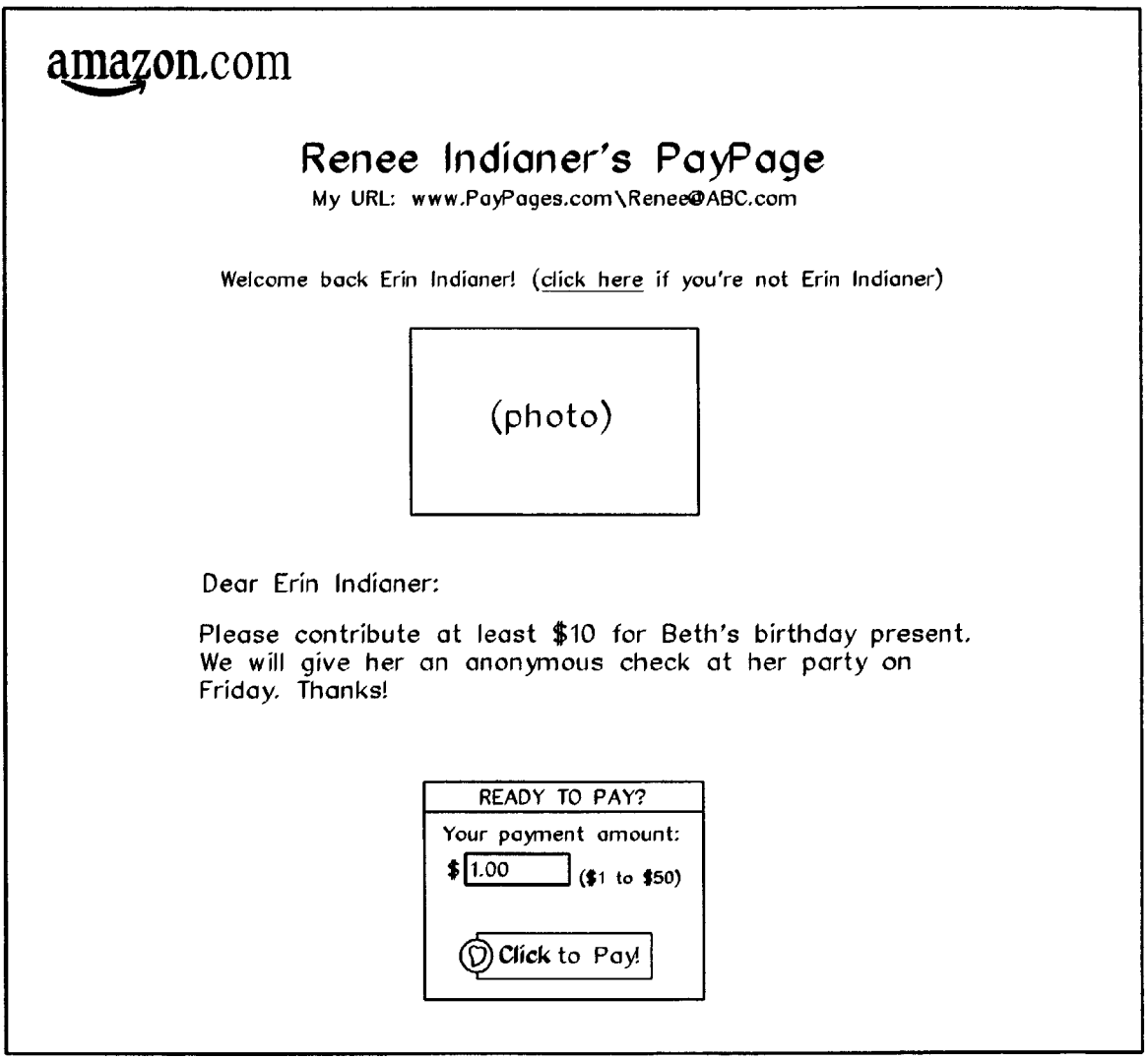

C. Sending a Payment Request (FIGS. 17-19)

As mentioned above, the payment service may also provide a service for users to send payment requests to other users via customized pay pages. The user preferably initiates a payment request by selecting a pay page to be used for the request (e.g., by selecting a "send payment request" link as shown in FIG. 5). Alternatively, the user could be prompted to select from a list of predefined payment request templates, in which case a new pay page may be created to process the payment request.

Figure 17:
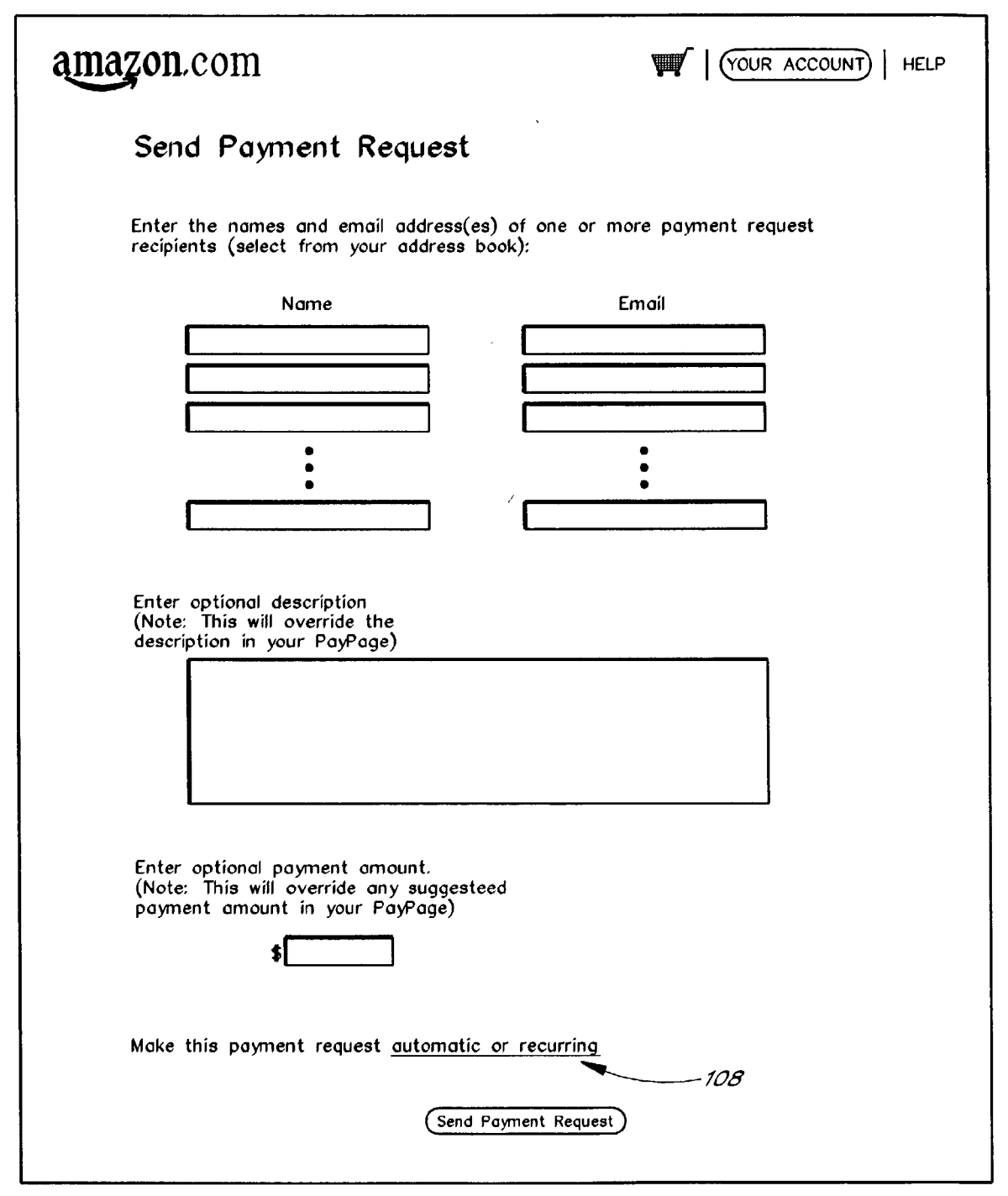

FIG. 17 illustrates an example page that may be used to send a payment request using a selected pay page. From this page, the user can enter (or select from a personal address book) the names and email addresses of the payers (payment request recipients). In one embodiment, new payers are automatically added to the user's personal address book.

As further illustrated in FIG. 17, the user may also enter an optional description and an optional payment amount, both of which override the description and payment amount (if any) defined within the pay page. Depending upon the type (template) of the pay page used, the user may also be prompted to specify other pay page fields and options (not shown). For example, if the payment request corresponds to a pay page for auction invoices, the user (payee) may also be prompted to enter the name of the winning bidder and the details of the transaction (item number, winning bid, shipping costs, etc).

In the illustrated embodiment, the "send payment request" page also includes a link 108 to a page (not shown) for making the payment request automatic or recurring. For example, the user can specify that the payment request should be re-sent each month, or should be sent automatically to a winning bidder upon completion of an auction.

When the user selects the "send payment request" link, the system 66 stores the submitted form data and sends email messages to each of the listed payers. As illustrated in FIG. 18, this email message includes a hyperlink 110 to the customized version of the selected pay page. The URL portion of this hyperlink (not shown) points to the pay page, and includes one or more parameters for customizing the pay page. These parameters may include the values entered by the pay page owner (e.g., the payment amount), and/or may include identifiers for allowing the pay pages application 76 to look up such values from a table. The use of URLs to pass pay page parameters is discussed separately below in section IV ("Pay Page Templates and Parameters"). When a payment request recipient selects the hyperlink, the system 66 returns the customized pay page as discussed above with reference to FIG. 3.

FIG. 19 illustrates an example pay page used to request donations associated with an event. In this example, the payer is recognized by the system and has the 1-Click service disabled. As mentioned above, pay pages used for other types of payment request scenarios may include other types of fields. For example, a pay page used for requesting payment from the winning bidder in an auction may include fields for the item number, winning bid amount, shipping charges, taxes, and a shipping address; these fields may be populated automatically by the pay pages application 76 in response to successful completion of an auction, or may be filled in by the seller.

IV. Pay Page Templates and Parameters

Pay page templates specify both the "look and feel" and the behavior of the pay pages. In the preferred embodiment, every pay page is based on a template. As mentioned above, templates may be provided by the SP for each of a variety of payment scenarios, such as charitable donations, events, invoices, auctions, rebate requests, and downloads of digital content.

Each template preferably specifies the elements that appear on a pay page. Table 1 below lists and describes the elements that may be included in a template in one embodiment of the invention. The column labeled "type or size" in Table 1 indicates the type or size of the element. The "display on template" column indicates whether the owner sees the element during the pay page creation/editing process (if set to NO, the element takes on the default value specified by the SP). The "edit by creator" column specifies whether the owner/creator can modify the value associated with the element during pay page creation. The "edit by payer" column indicates whether the payer (pay page visitor) can modify the value. The "pass in URL" column specifies whether the element's value can be passed as a parameter with the pay page URL.

TABLE 1

| Element | Description | Type or Size | Display on Template | Edit by Creator | Edit by Payer | Pass in URL |
|---|---|---|---|---|---|---|
| amount | the amount to be paid | currency | Y | Y | Y | Y |
| memo | note passed with payment | 80 | Y | Y | Y | Y |
| anonymous | hide payer's email address from payee | Boolean | Y | Y | Y | N |
| image | url pointer to page image | 120 | Y | Y | N | N |
| page title | Title of the page displayed to the customer and payee | 60 | Y | Y | N | N |
| page name | name of page, used in URLs | 16 | Y | Y | N | N |
| description | User description of themselves, PayPage | 2000 | Y | Y | N | N |
| bordercolor | Color used for PayPage border |  | Y | Y | N | Y |
| thanks_email | Contents of thank you e-mail to be sent to payer | 2000 | Y | Y | N | N |
| thanks_msg | Thank you message from payee to payer after payment has been made | 120 | Y | Y | N | N |
| pay_counter | Type of payment counter, if any | 8 | Y | Y | N | N |
| PassThru | Allow 1-click payments from pay boxes | Boolean | Y | Y | N | N |
| thanks_URL | URL of thank you page | 120 | N | Y | N | N |
| CompanyName | Name of Company | 40 | Y | Y | N | N |
| City | City of organization | 40 | Y | Y | N | N |
| State | State of organization | 40 | Y | Y | N | N |
| page_searchable | allow searching for this page | Boolean | Y | Y | N | N |
| transactiontype | type of transaction | 8 | N | N | N | N |
| e-mail | PayPage owner e-mail | 80 | N | N | N | N |
| name | PayPage owner name | 80 | N | N | N | N |
| event_date | Date of associated event | date | Y | Y | N | N |
| event_time | Time of associated event | time | Y | Y | N | N |
| label1-label6 | data field labels | 80 | Y | Y | N | Y |
| content1-content 6 | data field contents | 80 | Y | Y | Y | Y |
| shipping | shipping and handling amount | 6 | Y | Y | Y | Y |
| tax | tax amount | 6 | Y | Y | Y | Y |
| SKU | sku of item | 32 | Y | Y | N | Y |
| order number | order number | 32 | Y | Y | N | Y |
| addr_name | name | 80 | Y | Y | Y | N |
| addr_line 1 | line 1 of address | 80 | Y | Y | Y | N |
| addr_line 2 | line 2 of address | 80 | Y | Y | Y | N |
| addr_city | city | 80 | Y | Y | Y | N |
| addr_state | state | 80 | Y | Y | Y | N |
| addr_zip | zip | 80 | Y | Y | Y | N |
| addr_country | country | 80 | Y | Y | Y | N |
| charity | PayPage is for a charitable purpose | Boolean | Y | Y | N | N |
| tipping | Template supports tipping | Boolean | N | N | N | N |
| charity_ID | ID of organization (if charity) | 20 | Y | Y | N | N |
| syndicate | Allow page to be syndicated | Boolean | Y | Y | N | N |
| syndicate_fee | Syndicate fee (commission) | % | Y | Y | N | N |
| provider-syndicate_fee | % of the syndicate fee that SP receives | % | N | N | N | N |

Some of the elements, such as the page title, amount, and description fields, are preferably required for all templates. Other elements may be selected at will by the template designer.

The templates may also reference page handlers for performing specific actions. For example, the handler for a rebate template may extract the serial number of the purchased item and determine whether the number appears in a list of valid serial numbers. The handler could also update a database to mark this serial number as "used." In addition, the templates may include Javascript or other code for performing field validation, calculations, or other functions.

For elements that can be passed by URL, a pay page's values may be overridden by parameter values contained within the URL (see block 92 of FIG. 3). These modified values may be specified by a pay box or other link to a pay page (e.g., an overriding suggested payment amount), or by advanced users. In a preferred embodiment, the parameters are passed as name-value pairs and can be passed in any order. For example, a URL specifying the amount, SKU, sale price, tax, and shipping for an item may be of the following form:

http://www.server.com/bob@antiques.com/?amount=20.00, sku=1234, tax=4.50, shipping=3.50, itemprice=12.00

V. Pay Boxes and SP-Generated Display Objects

Each pay box preferably has a unique identifier that is assigned upon creation by the pay page owner. The identity of the corresponding pay page may be encoded within and determinable from this identifier. This identifier is preferably used by the image server 77 (FIG. 2) to look up the associated pay box specifications from the content database. Some or all of the pay box's specifications, such as the style, color, and a pay page identifier, may alternatively be encoded within the pay box identifier.

There preferably are two URLs associated with each pay box. The first URL is used to serve the pay box graphic, and may, for example, have the following form:

http://www.server.com/payboxes/{pay box ID}.gif

The second URL points to the corresponding pay page, and is used to retrieve the pay page when a user clicks on the pay box graphic. This URL may, for example, have the following form:

http://www.server.com/{pay box ID}

As mentioned above, one or more parameters (such as a suggested payment amount) may be passed with this second URL. The pay box ID is preferably included in the second URL to allow the application 76 to trackclick-through events on a per-pay-box basis. Requests for the pay box graphic may also be recorded to track the ratio of click-through events to pay box impressions. As described below, historical data regarding impressions (i.e., viewing events), click-through rates, and success (payment) rates, may be provided to the pay page owners.

For associate-hosted pay boxes, the URL formats are the same except that they include an identifier of the hosting associate. For example, the URLs may have the following formats:

http://www.server.com/payboxes/{associate ID)/{pay box ID}.gif http://www.server.com/{associate ID}{pay box ID}

The associate ID is preferably recorded each time the associate-hosted pay box is requested, and each time the pay page is requested from that pay box. As discussed above, the pay pages application 76 also uses the associate ID to credit an account of the referring associate when an associate-referred visitor makes a payment.

As described above, the pay box URLs and associated HTML coding are generated automatically by the application 76 when a second party (owner) or third party (associate) selects a pay box to host (see FIGS. 10 and 16). Web site developers may alternatively install the pay boxes by manually generating the HTML or other coding.

Figure 20:
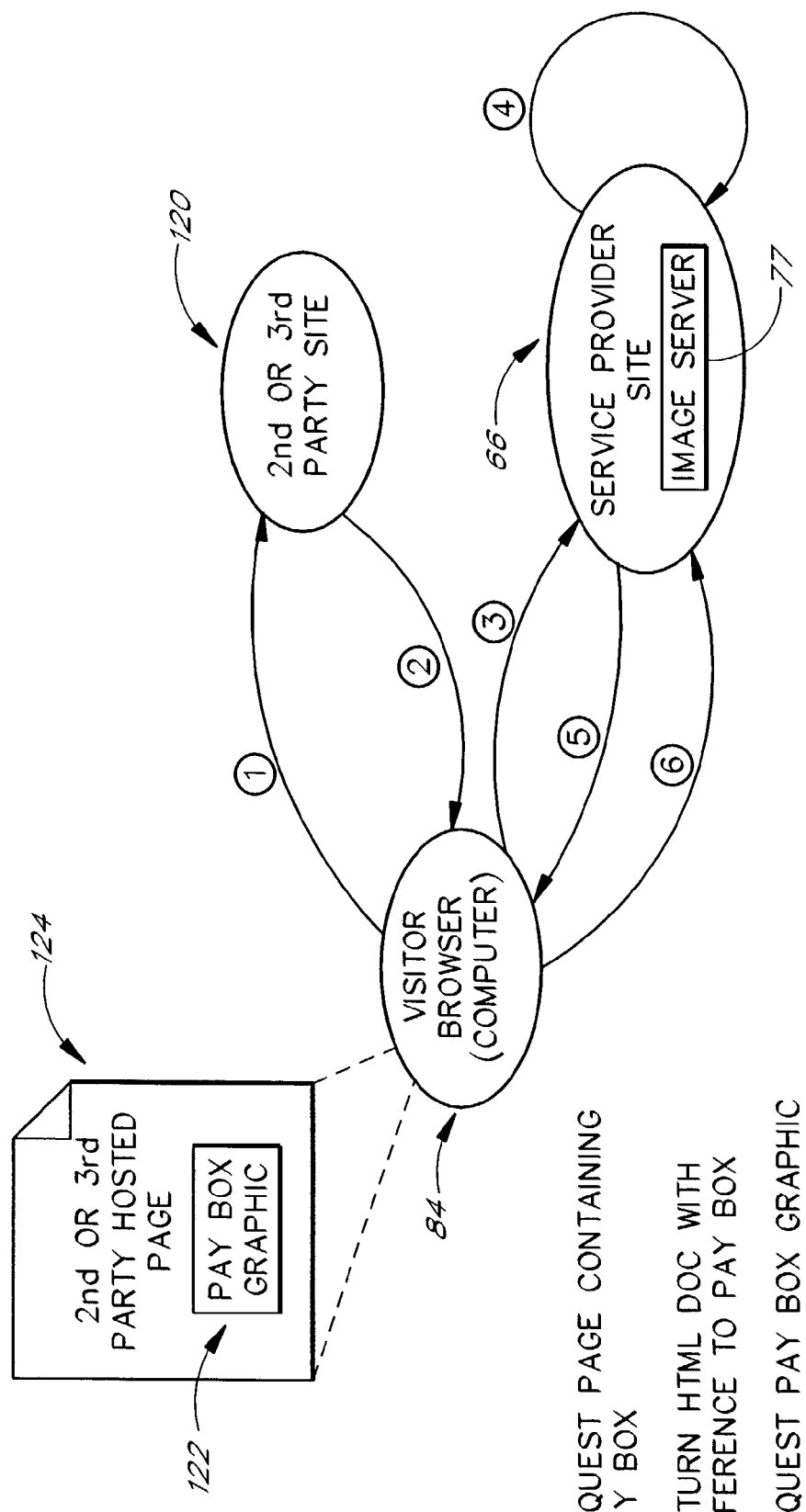
FIG. 20 illustrates a sequence of events that occur when a user requests a web page containing a pay box.

FIG. 20 illustrates the general sequence of events that occur, in one embodiment, when a user (visitor) requests and views an external ($2^{nd}$ or $3^{rd}$ party) web page containing a pay box. The drawing is also illustrative of the method used by the SP site to serve customized display objects other than pay box images. Initially, the visitor's browser 84 transmits a request for the page to the $2^{nd}$ or $3^{rd}$ party site 120 (event 1). The site 120 responds by returning the requested HTML document with the reference to (URL of) the pay box graphic (event 2). Upon parsing the HTML document and detecting this reference, the browser requests the pay box graphic from the SP site 66 (event 3). If the visitor is an existing user of the payment service, this request may include a cookie that can be used by the SP site to look up the name and 1-Click settings of the visitor.

The SP site 66 responds to this request by generating the pay box graphic (event 4), as described with reference to FIG. 3. As part of this process, the image server 77 looks up and/or decodes from the pay box ID the specifications of the pay box. These specifications may include, for example, the pay box size, color, message, and suggested payment amount specified by the pay page owner. In addition, if the request included a valid cookie, the image server 77 looks up the visitor's name and 1-Click settings. The image server 77 uses the pay box specifications and visitor-specific information (if available) to generate the pay box graphic. As described above, the graphic may include the visitor's name, and may include a 1-Click payment button 92F (FIG. 4) if the 1-Click service is enabled. In one embodiment, payers may pre-specify the type or level of customization provided within pay box graphics (see section IX titled "Payer Preferences for Treatment on External Sites").

The image server 77 could also include other types of personalized information within the graphic, or within another display object. For example, the graphic, or a separate dynamically-generated graphic, could be customized to include selected digits of the visitor's default credit card. In one embodiment, for example, the image server also generates and serves a separate bar which is displayed at the top of the same external web page. This bar preferably contains the name of the visitor (if recognized by the SP site), and information about payments made during the current browsing session. The bar may also include buttons for performing certain functions, such as negating the last payment, or adding an article being viewed to a personal library maintained by the SP.

Further, the pay box graphic or other display object could include personal recommendations of products or services available for purchase from the SP. The personal recommendations may be generated based on user's purchase histories, browsing histories, and/or explicitly-specified interests, using methods that are well know in the art. These personal recommendations, and/or other display attributes of the graphic, could be selected based further on the identity of the hosting site 120. For example, if the hosting site 120 is an online sports shop and the visitor's profile indicates an interest in surfing, the graphic may list surf-related products sold by the SP.

Further, rather than serving a customized graphic, the SP site could serve another type of object selected or customized based on the user's identity, such as a textual link or a streamed audio of video clip. It will also be recognized that the personalized graphic images or other display objects could be pre-generated (generated prior to being requested), and/or cached following to dynamic generation, so that they need not be generated on-the-fly on each request.

As further illustrated by FIG. 20, the image server returns the dynamically generated pay box graphic to the browser (event 5), and the browser displays the graphic 122 within the web page 124. Because the SP site serves the graphic directly to the visitor's browser, the personal information contained in the graphic is not exposed to the external web site or its operator. If the visitor subsequently selects the pay box (e.g., clicks on the graphic), the browser sends a request for the corresponding pay page to the SP site 66 (event 6). As described above, this request may include one or more pay page parameters.

As will be appreciated from the foregoing, the method by which the SP site displays personalized graphics within external sites may be used for a variety of non-payment related applications (e.g., providing personal recommendations or links to related content). Further, the method may be used to serve personalized objects other than images.

VI. Pay Box Tracking and Feedback Reports

The pay pages application 76 may provide periodic feedback reports to pay page owners and/or their associates. For owners, the feedback reports may include one or more of the following metrics, shown separately for each of the owner's pay boxes: (a) number of pay box impressions (viewing events), (b) number of pay box click-through events, (c) number of payments resulting from such click-through events, and (d) any resulting commissions. For pay page associates, the periodic feedback reports may include the same metrics (a)-(d), but the data would be provided separately for each pay box hosted by that associate.

To generate the feedback reports, the pay pages application 76 preferably logs the following information each time a pay box is requested by a visitor's browser: (a) the pay box ID; (b) the associate ID, if any; (c) whether the visitor subsequently clicked through (selected) the pay box; (d) whether the click through event resulted in a payment to the pay page owner, (e) the amount of the payment, if any, (f) the amount of the associate commission, if any, (g) the identity of the visitor, if known, and (h) the date and time of the visit. These and other types of information may be extracted from a server access log using well known methods.

In addition to the information listed above, the owner may be provided with data regarding the number of associates that have signed up to host each pay box.

Figure 21:
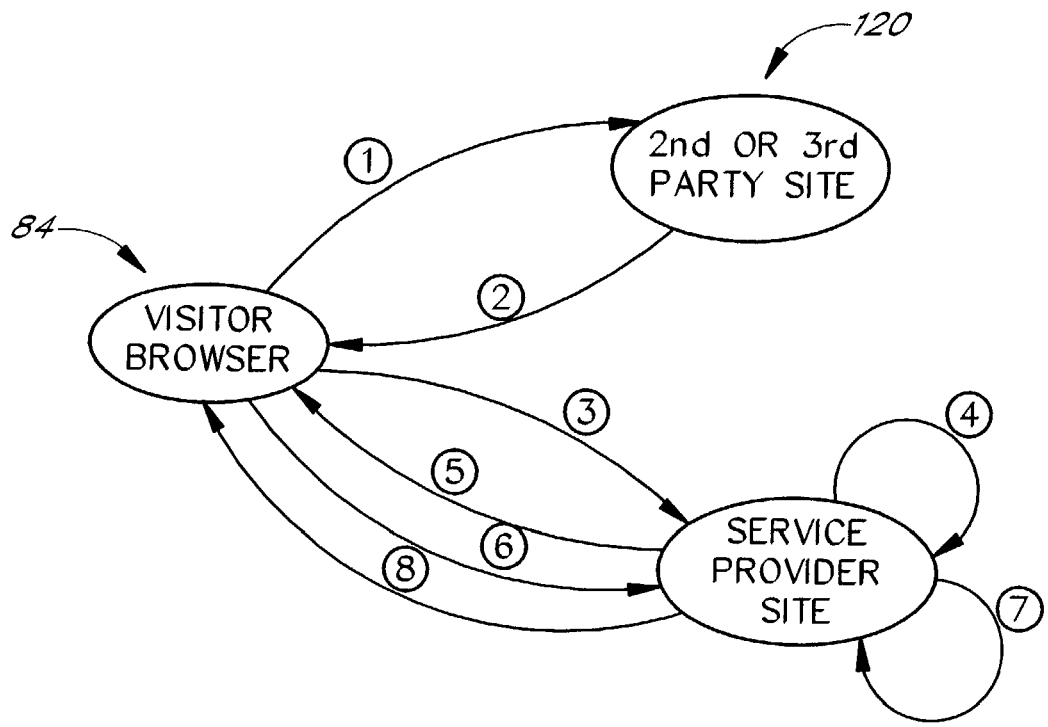
FIG. 21 illustrates a method by which 1-Click users may complete payment transactions directly from externally-hosted pay boxes.

VII. 1-Click Payments from External Sites (FIG. 21)

Another feature that may be implemented by the service allows users to make 1-Click (single action) payments directly from externally-hosted pay boxes or other display objects (i.e., without viewing the corresponding pay pages during the payment process). To implement this feature, each pay page may be assigned a "PassThru" property indicating whether 1-Click payments from pay boxes are enabled. The owner may be permitted to specify the page's PassThru setting during creation or editing of a pay page. For pass-through-enabled pay pages, the SP site 66 serves special 1-Click pay boxes to recognized 1-Click visitors. When a visitor selects a 1-Click pay box, the SP site immediately redirects the user to the "thank you" URL pre-specified by the owner (or possibly the hosting associate).

FIG. 21 illustrates this process in further detail. It is assumed in the illustrated example that the user has the 1-Click service turned ON, and that the pay page associated with the requested pay box is pass-through-enabled (has PassThru turned ON). Events 1-3 are the same as in FIG. 20. In response to the request for the pay box graphic (event 3), the SP site 66 determines that the visitor has the 1-Click service turned ON and that the pay page is pass-through enabled. The SP site therefore generates and returns a special 1-Click version of the graphic (events 4 and 5). This graphic includes a 1-Click button or message indicating that selection will complete the transaction. In addition, as described above, the pay box graphic displays the names of the visitor and the payee, and may include other information such as selected digits of the credit card number to be used for the transaction.

Upon selection of the pay box graphic, the browser 84 transmits a request for the pay page together with the user's cookie (event 6). Because the cookie indicates that the user is a 1-Click user, the site 66 responds to this request by (1) executing the transaction according to the visitor's 1-Click settings (event 7), and (2) redirecting the browser to the owner-specified "thank you" URL (event 8). This URL may, for example, be a page of the pay page owner's external web site. The visitor's browser could alternatively be redirected back to the external page from which the payment was initiated, in which case this page may then be displayed with an SP-served display object containing a payment confirmation message (e.g., "you just paid $1 to ContentProvider.com").

Although a special 1-Click version of the pay box graphic is preferably presented to recognized 1-Click users (events 4 and 5 in FIG. 21), a standard graphic or other link could alternatively be displayed to all users (e.g., a button which reads "click here to pay 25 cents"). In such embodiments, the name of recognized visitors could optionally be displayed in some other display object served by the SP site (such as a bar at the top of the web page) for display within the same external web page. In addition, although the pay box graphics in the above examples include text indicating the payment amount, the payment amounts could be conveyed by another method. For example, green, blue and red payment buttons could represent payments of 5 cents, 10 cents, and 25 cents, respectively. Further, a given external web page could include multiple 1-Click pay boxes (e.g., the three color-coded buttons mentioned above) to permit the visitor to select the payment amount.

The method illustrated in FIG. 21 and described above can also be used without requiring payees to have their own pay pages. For example, upon registering with the SP, the payee may be given a unique URL to be used for receiving payments from visitors to external ($2^{nd}$ and/or $3^{rd}$ party) sites. This URL would take the place of the unique pay page URL. For recognized 1-Click visitors, the process would be the same as shown in FIG. 22 and described above (i.e., the visitor would immediately be redirected to a thank you page, etc.). For visitors who are not recognized 1-Click users, selection of the pay box would preferably cause the SP site to return a sign-in page. The user would then sign in (or register, if necessary), and then complete payment via a generic payment pipeline.

It is also contemplated that the service could require that all payments made from external sites be made as 1-Click payments (i.e., users would not be given the option to turn the 1-Click service ON and OFF for purposes of making such payments). In such embodiments, all recognized visitors may be treated as 1-Click users.

Figure 23:
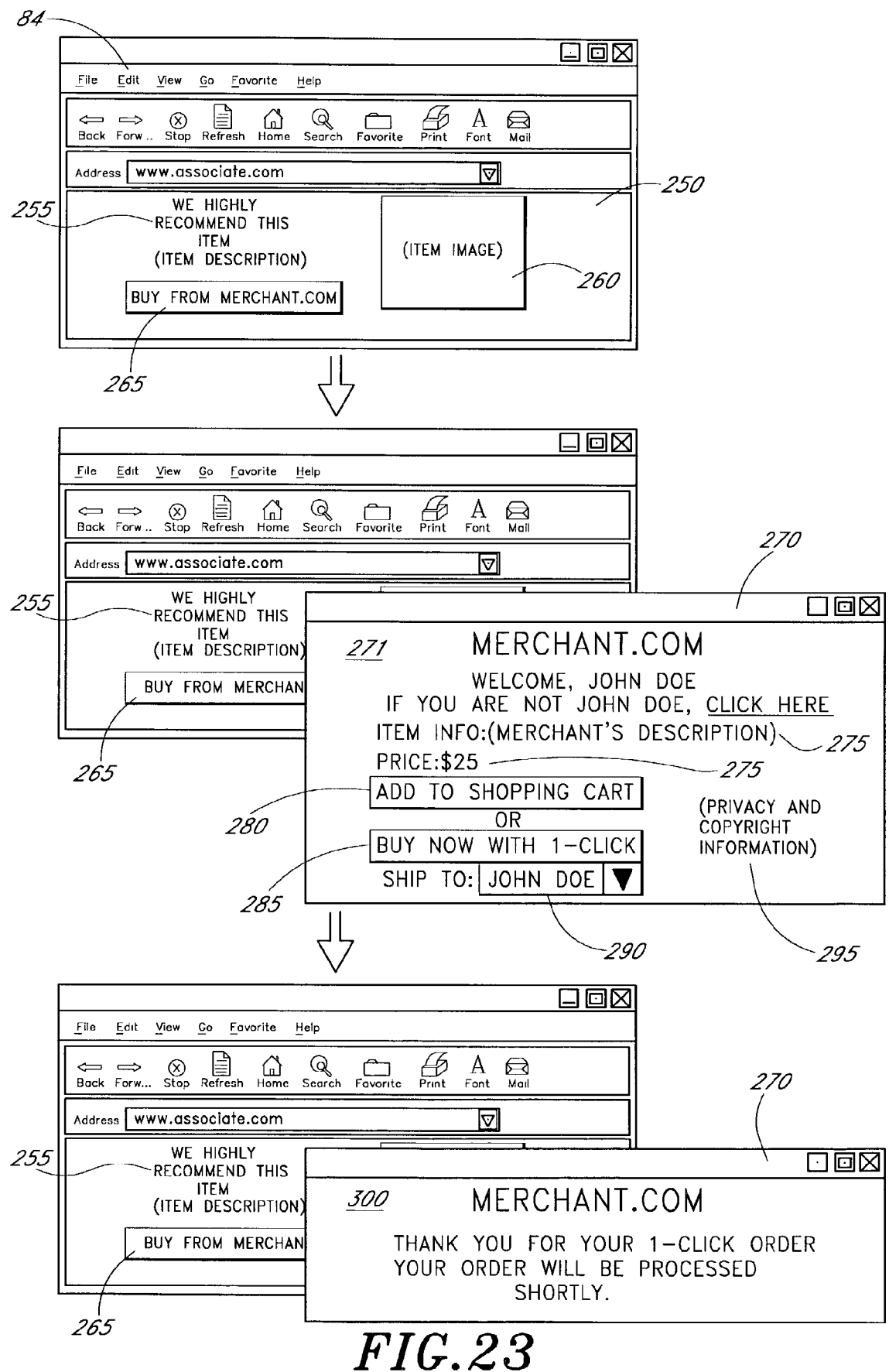
FIG. 23 illustrates the general screen flow seen by a 1-Click user as the user makes a 1-Click purchase of an item while browsing an associate's web site.
Figure 24:
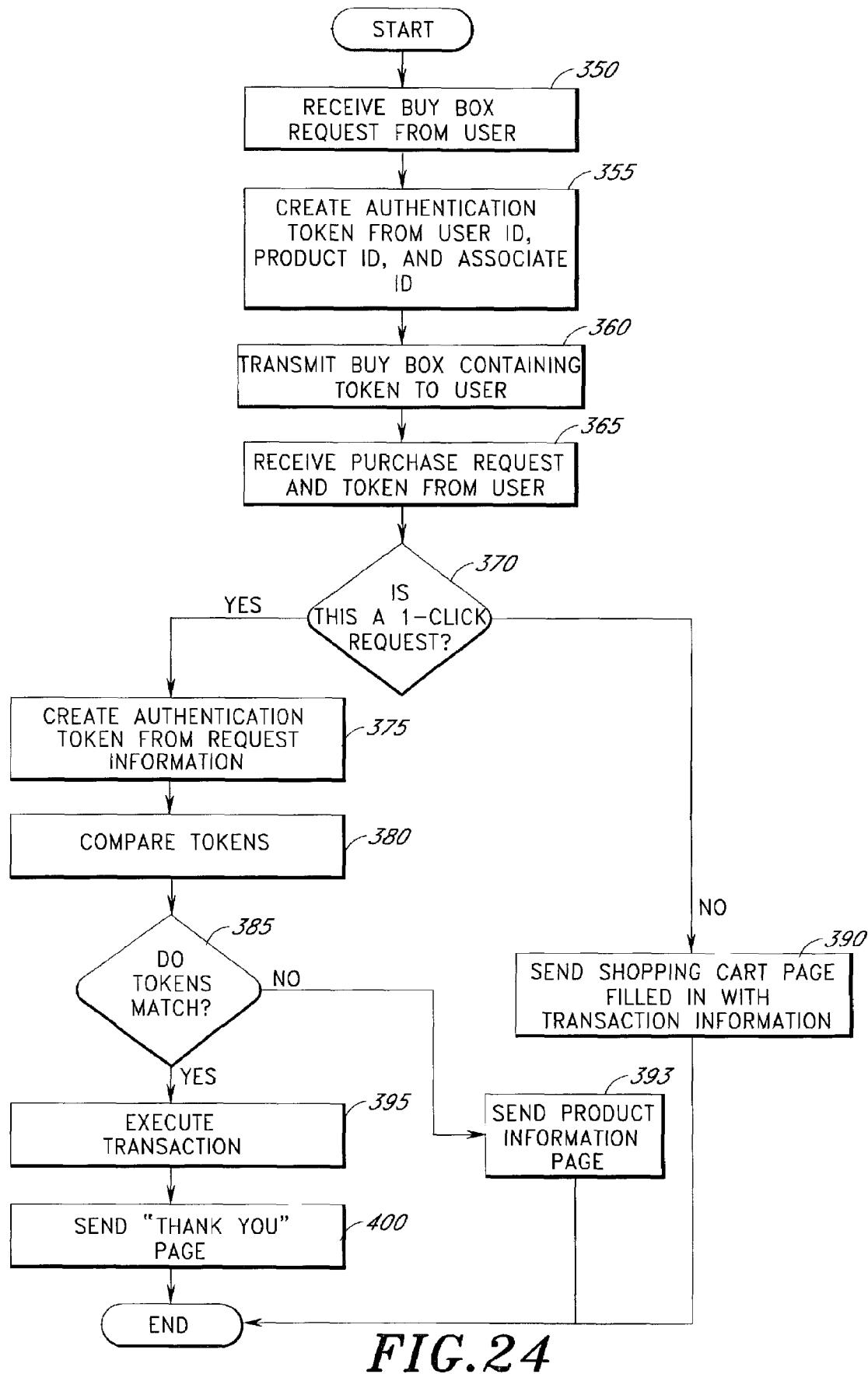
FIG. 24 illustrates the process through which a service provider creates buy boxes and checks the authenticity of a purchase request.

VIII. Validation of Transactions Initiated from Third Party Sites (FIGS. 22-24)

Various methods will now be described for allowing users to initiate, and for allowing a merchant or other service provider to validate/authenticate, single-action and other transactions while browsing third party web sites. These methods are particularly useful for enabling single-action purchases during browsing of associate web sites, but may also be applied to other types of transactions.

A. Purchases Initiated while Browsing Associates Web Sites

One aspect of the invention involves a system and associated methods for allowing customers of an online merchant to make purchases from the merchant's catalog, and/or perform other types of transactions, securely while browsing external, associate web sites. By way of background, as described above, one deficiency in existing associate systems is that customers typically must exit (discontinue browsing of) an associate web site in order to complete a purchase of an item selected from that site. In addition to being inconvenient to the customer, this aspect of existing systems deters potential associates from participating in merchants' associates programs.

The present invention addresses this problem by providing a service through which customers can securely select an item from an associate's web site, and purchase the item from the merchant web site (or perform another type of transaction such as add the item to a personal shopping cart or wish list), without having to exit the associate web site. Preferably, the user can complete the transaction without having to supply a username, password, or any other authentication information. Depending upon the nature of the merchant's business, the items may include, for example, retail products sold by the merchant, used products offered in an online marketplace managed by the merchant, and/or downloadable content.

The service makes use of a buy box which is served by the merchant web site for display within, or in conjunction with, a page of an associate's web site. In the embodiment depicted in the drawings, the buy box is a web form that is presented in a pop-up browser window, although the buy box may alternatively be in the form of an image file or other display object displayed within the associate's web page. As with the pay boxes described in preceding sections, the buy box may be personalized for the particular customer (e.g., with the customer's name, credit card information, shipping information, etc.), without exposing the customer's information to the corresponding associate. For customers that have enabled 1-Click purchasing on the merchant's web site, the buy box preferably includes a button or other link for purchasing the item as a 1-Click transaction.

One potential risk associated with allowing users to make 1-Click or other purchases from such buy boxes is that the information contained in the buy box may potentially be used for fraudulent purposes. For example, by modifying the associate ID encoded within a buy box, one associate could potentially take credit for customer referrals from the web site of another associate. In addition, by modifying a product ID or product quantity encoded within a buy box, a hacker could potentially cause customers to purchase items without their knowledge. Another risk is that an entity may copy a buy box to its web site without the merchant's permission, and in doing so, strip out or change the branding, appearance, and/or messaging in a manner that adversely affects the merchant. To address these risks, various techniques are disclosed for verifying that a 1-Click purchase request that purportedly corresponds to a particular customer, item, and associate actually corresponds to a previously rendered buy box generated for that customer, item, and associate.

To make use of the service in one embodiment, an associate initially incorporates a "buy" button 265 (FIG. 23) into its web site in association which each of the merchant's products for which the associate refers customers. This button 265, referred to herein as a "buy box button," serves as a product-specific reference to the buy box served by the merchant web site, and may optionally be added to the associate's web site using a link generation tool provided on the merchant's site.

When the user selects such a button to cause a buy box request to be sent to the merchant's web site, the merchant web site generates and returns an instance of the buy box 271 for display within a pop-up browser window 270 (see FIG. 23). If the user is recognized by the merchant site and has 1-Click purchasing turned ON, the buy box is rendered so as to include a 1-Click button 285 or other link for allowing the user to complete the purchase with a single selection action. In embodiments in which the buy box is actually incorporated into a web page of the associate web site (not shown), it is not necessary to display a buy box button 265 and the 1-Click purchase may be made directly from the associate web page.

FIG. 22 illustrates the general sequence of events that occur, in one embodiment, when a user (visitor) requests and views an associate web page containing a "buy" button 265 that references a buy box 270. It is assumed in the illustrated examples in FIGS. 22-24 that the service provider is acting as a merchant of items, that the user has 1-Click purchasing turned on, that the associate site 201 is an external web site that displays a buy button 265 as described above. The particular fraud detection/prevention scheme depicted in these drawings, and particularly FIGS. 22 and 24, represents one possible method for authenticating the purchase request; other methods are described separately below.

Initially, the visitor's browser 84 transmits a request for the page to the associate site 201 (event 1). The site 201 responds by returning the requested HTML document containing a clickable buy box button 265 (event 2). The user, having the information provided by the associate web site regarding a particular item, clicks on the buy box button 265 in order to initiate a purchase of the corresponding item (event 3). In response to this selection action, the user's web browser 84 transmits a requests for the buy box to the service provider site 66, together with the associated browser cookie data stored on the user's computer (event 4). In the illustrated embodiment, a buy box is served regardless of whether the user has 1-Click shopping turned on or whether the user is recognized by the service provider, however alternate embodiments may elect to not serve up a buy box to an unrecognized user.

In one embodiment, the buy box request contains a unique identifier for the associate, a unique product identifier, and a cookie that identifies the user. The product and associate identifiers may be included in the code for the associate's buy box button 265, as is known in the art, so as to cause these values to be transmitted to the service provider site when the button is selected. Alternate embodiments may allow buy boxes to be used with non-associate external web sites, although this would reduce some security of the system. For increased security with non-associate external web sites, some embodiments may use a unique identifier for the web site, one example being a domain name, that would effectively substitute for the associate ID.

The user ID may be extracted from or looked up using the cookie, as described above for the use of 1-Click pay pages in Sections V and VII. As was described above, the request is made without exposing to the associate web site 201 or its operator any of the user's personal information. The following is representative HTML code that would be inserted into an associate web page in order to request the buy box for a particular product and a particular associate (associate ID ASSOCID, product ID 0060512806, corresponding to the paperback edition of Neil Stephenson's book Cryptonomicon):

```
<SCRIPT LANGUAGE="JavaScript">
function popUp(URL) {
window.open(URL,'','location=yes,scrollbars=yes,status=yes,toolbar=yes,resizable=yes,
    width=380,height=450,screenX=10,screenY=10,top=10,left=10');
}
</SCRIPT>
<a
    href="javascript:popUp('http://buybox.amazon.com/exec/obidos/redirect?tag=
    fjdskl-20&path=/dt/assoc/tg/aa/xml/assoc/-
    /0060512806/ASSOCID/ref=ac_bb1_')">
<img src=http://rcm-images.amazon.com/images/G/01/associates/remote-buy-
    box/buy1.gif border=0 alt='Buy from Amazon.com'></a>
<noscript>
<form method="POST" action="http://buybox.amazon.com/o/dt/assoc/handle-buy-
    box=0060512806">
<input type="hidden" name="asin.0060512806" value="1">
<input type="hidden" name="tag-value" value="ASSOCID ">
<input type="hidden" name="tag_value" value="ASSOCID ">
<input type="image" name="submit.add-to-cart" value="Buy from Amazon.com"
    border="0" alt="Buy from Amazon.com" src="http://rcm-
    images.amazon.com/images/G/01/associates/add-to-cart.gif">
</form>
</noscript>
```

As mentioned above, alternative embodiments may not require the user to click a buy box button 265 to proceed. For example, the associate web page may contain code such that the buy box is embedded and is automatically requested by the browser 84 when the associate page is loaded, in a manner similar to the implementation for pay boxes in Section V. In yet another embodiment, the buy box may be requested automatically by the browser 84 when the user hovers the mouse pointer over the buy box button 265 (or some other designated area of the screen), and may either open up in place of the button or in a separate window. It will be appreciated that in those implementations that do not require an affirmative action (e.g. a "click") by the user, the service provider may actively delete from its access logs information about which user requested the information and any associated IP addresses, since the service provider's involvement would not necessarily have been desired by the user when the user is viewing the associate site.

Upon receiving the request from the user's browser 84, the service provider site 66 creates an authentication token to be used to securely authenticate any 1-Click purchase made by the user (event 5). This token is created so that if the 1-Click request is made from the user's browser 84, the service provider can ensure that the request has the same information that was included in the buy box. In the embodiment shown, the authentication token is created by the service provider's web server 205 based on the product (item) ID, the customer identifier, and the associate identifier associated with the request. In the preferred embodiment, the token is created as a one-way encryption (hash) of such data such that a potential hacker or mischievous associate can not easily create a token that would correspond to a different product, associate, and/or user. Further detail about the creation of the authorization token is given in the discussion below with respect to FIG. 24.

The service provider site 66 then generates, and transmits to the browser 84, a buy box containing the above information, the authorization token, a button for adding the item to a shopping cart, and a button for purchasing the item as a 1-Click transaction (event 6). The buy box structure and appearance are described in greater detail in the discussion below with respect to FIG. 23. The token, associate ID, and product ID are encoded within the buy box coding such that they will be transmitted to the service provider site if the user selects the 1-Click button or the "add to shopping cart" button.

If the user desires to immediately purchase the described item, he or she chooses the 1-Click option in the buy box, and the browser 84 transmits a 1-Click purchase request to the service provider site 66 (event 7). In the illustrated embodiment, this request includes the product ID, the associate ID, and the authentication token, all of which were included within the coding of the buy box. The 1-Click purchase request also includes a cookie which contains, or may be used to look up, an ID of the user. In response to this purchase request, the service provider site 66 creates a second authentication token using the same one-way encryption method that was used to generate the first token, only this time the token is created with the user ID, associate ID and product ID corresponding to the 1-Click purchase request. The first and second tokens are then compared to check the authenticity of the purchase request (event 8). If the tokens match (indicating that the 1-Click request is very likely legitimate/authentic), the service provider site 66 processes the 1-Click transaction, and redirects the pop-up buy box window to a "thank you" page informing the user that no further user action is required (event 9). The service provider site 66 could alternatively present a confirmation page requiring the user to select a "confirm order" button to complete the order.

FIG. 23 illustrates a 1-Click buy box purchase from the user perspective. The first image shows how a user begins by directing his or her browser 84 to a page 250 of the associate's web site 201. This page includes an item description 255 which may, but need not, be in the form of a recommendation or editorial provided by the corresponding associate. The web page 250 may also include a picture 260 of the item. The price of the item may be included on the associate's page and/or supplied by the merchant within the buy box. The page also includes a buy box button 265 for buying the described item, although users could alternatively be permitted or required to initiate the purchase by selecting the item's image 260 or description 255.

The second image of FIG. 23 shows one implementation of the user interface after the user has clicked on the buy box button 265. In the illustrated implementation, the buy box 271 appears within a secondary, "pop-up" browser window 270.

Although depicted using overlapping windows, the pop up window 270 is typically be displayed within the boundaries of the browser window that displays the associate's web page 250, allowing the user to continue to view a portion of the associate's web page. In the illustrated embodiment, the buy box 271 includes personalized text along with standardized graphical objects, although alternative embodiments could involve a buy box incorporating associate-customized graphics similar to those discussed above in Section I with respect to pay box graphics. As illustrated, the buy box may also include copyright and privacy information 295, which may include information about how the remote buy boxes work or may explain that the associate web site does not have access to personal information about the user.

In the illustrated embodiment, the buy box 271 contains information 275 from the service provider about the item being purchased. The buy box also includes a button 280 for adding the item to the user's personal shopping cart, and a button 285 for purchasing the item as a 1-Click transaction. Associated with the 1-Click button 285 in this example is a drop-down menu 290 that lists a plurality of possible destinations for shipping the item, as pre-specified by the user maintained in a user database of the service provider site 66. By selecting a particular destination from this list prior to selecting the 1-Click button 285, the user can conveniently specify the shipping address associated with the 1-Click purchase transaction.

The various recipient addresses represented within the drop-down list 290 are preferably obfuscated into unique numerical values within the buy box's coding so that a malicious third party cannot easily substitute a different address into a 1-Click request. Because the addresses represented in drop-down boxes in traditional 1-Click forms (e.g. those contained within a service provider's web site) are also obfuscated by unique numerical values, some embodiments utilize two-way encryption on these values to create the values used in drop-down list 290. The values are then decrypted after the buy box purchase request is received by the service provider site so that the original address values are attained. These original values are then used to look up corresponding shipping addresses within the service provider's 1-Click customer address database. Thus, while malicious third-parties could acquire drop-down address values by analyzing the source code of a service provider/merchant's web site, these values would be of no use to them when trying to tamper with a buy box.

As will be recognized, any of a variety of additional types of personalized content may be provided in a buy box server to a user. For example, the buy box may display personalized recommendations, or may display the last few digits of a default credit card to be used for the transaction. The buy boxes may also display item inventory information.

The third image of FIG. 23 shows the user experience after having selected the 1-Click button 285. In the illustrated embodiment, the pop-up window 270 has been redirected to a "thank you" page 300 that confirms placement of the 1-Click order. As will be appreciated, alternate embodiments may omit the "thank you" page entirely, and may close the buy box, letting the user assume that the transaction has completed. Also, as mentioned above, a confirmation page may be displayed requiring the user to confirm the order.

The screen displays illustrated in FIG. 22, and particularly the buy box display, illustrate the scenario when the user is recognized and has 1-Click purchasing turned on. If the user is not recognized by the service provider site 66, the 1-Click button 285 is omitted from the buy box 271, but the "add to shopping cart" button is maintained. If the user is recognized and does not have 1-Click purchasing turned on, the buy box 271 may display the "add to shopping cart" button 280 together with a link for turning 1-Click purchasing on. As described in the following section, the content of the buy box 271 may also depend on settings specified by the user. For example, users may be permitted, via the service provider site 66, to request that they not be identified within buy boxes.

A set of components that may be included within the service provider site 66 to implement the above-described features are depicted in FIG. 22. The web site 66 includes a web server 205 that accesses an HTML database 209, customer and associate databases 211, and a products database 214. The HTML database includes web pages and templates for performing various types of actions, such as searching/browsing the products database 214, updating personal account information, purchasing products, and registering to become an associate. The customer and associate databases 211 include information about registered customers and associates of the service provider web site 66. The products database 214 includes the items descriptions included within the merchant/services provider's online catalog. The site also includes a buy box generation/validation program module 205A that generates buy boxes and authenticates/validates associated purchase requests, and a transaction processing module 205B that handles the processing and fulfillment of authenticated purchase requests.

The service provider site also includes a web services server 217 that is used to serve product information to associate web sites based on requests received from the associate sites. For example, an associate wishing to display a particular product may send a request to receive information associated with that product to the web services server 217. The request may take the form of a call containing the product ID associated with the product. The web services server returns to the associate the pieces of information that are requested, which may include such information as a picture, a description, the price, the dimensions, customer reviews about, or any other information pertaining to the product. Upon receiving the information, the associate may format and display the information in a manner that is appropriate for the design of their website. For product information that might periodically change, such as the price of a product, the associate may be required to send queries to the web services server on a regular basis in order to ensure that the information remains accurate on the associate web site.

FIG. 24 illustrates the basic process by which the service provider web site 66 generates buy boxes, verifies the authenticity of 1-Click requests, and completes transactions in the embodiment depicted in FIG. 22. As depicted by block 350, the service provider site 66 initially receives a buy box request from the user's web browser 84. In one embodiment, this may take the form of a URL reference containing the product ID and the associate ID, although alternative embodiments may utilize other call methods to request a buy box. Additionally, the request can be accompanied by a cookie identifying the user as described above in Section V. As depicted by block 355, the service provider site 66 creates an authorization token from the received information and, in block 360, transmits a buy box containing the authorization token to the user's browser. In the preferred embodiment, the token generated in block 355 is created through the HMAC mechanism for message authentication, which can utilize any iterative cryptographic hash function (e.g. MD5, SHA-1) along with a secret key. However, alternative embodiments may use any one-way encryption algorithm, as will be appreciated by one of ordinary skill in the art, as long as it is sufficiently strong to prevent a malicious third party from determining how to mimic the encryption. Further, as described below, the service provider site 66 can use a two-way encryption algorithm or a look-up table method (in which case the encryption task may be omitted) to keep track of rendered buy boxes and their associated information.

By utilizing a strong one-way encryption algorithm, and keeping the associated key secret, the service provider can be relatively certain that no malicious party can create both a false buy box 1-Click request and an accompanying token. The service provider site can therefore trust the veracity of a request if it matches the token that accompanies it. It will also be understood that alternative embodiments may use different pieces of information in creating the token.

In block 365, the service provider site 66 receives a purchase request along with the accompanying token. In the preferred embodiment, the site may accept requests only for single items. For those service providers that allow multiple items to be purchased simultaneously, the token-creation procedure may be simple (e.g., only one item used to create a token) or more complex (e.g. multiple items used to create the token) depending on the processing resources of the service provider. The complexity of the token-creation procedure allows the integration of secure remote purchasing with existing transaction-processing systems in an efficient manner. Alternative embodiments may of course allow for multiple items or multiple units of the same item.

The site in block 370 determines if the request was for a 1-Click purchase or for a "shopping cart add." If the request was not a 1-Click request, the service provider site sends a shopping cart page with the product information filled in (block 390). The shopping cart page may be displayed in the pop-up browser window 270, and the user may continue to use this pop up window, if desired, to browse and make purchases from the merchant/service provider site 66.

If the site determines in block 370 that the request is for a 1-Click purchase, the request is checked to ensure that it is for the same product, user, and associate as was sent out in the buy box supplied in block 360. Specifically, in block 375, the site uses the user ID, product ID, and associate ID specified within the 1-Click request to create an authentication token utilizing the same encryption mechanism used in block 355, and, in block 380, compares the tokens. If, in block 385, the tokens do not match, the site will treat the transaction as potentially fraudulent. The site will also treat the transaction as potentially fraudulent if no token is included in the purchase request. In either event, the site may return an error page, a product detail page for the product, or may process the request as a "shopping cart add" request. Because purchases from the shopping cart typically require the customer to sign in (i.e., supply authentication information), the risk of a fraudulent transaction emanating from a user's shopping cart is significantly reduced. In addition, some embodiments may log the particular type of error and either warn or punish affected parties accordingly. For example, the service provider may warn an associate if it determines that malicious information is routinely being substituted in purchases made from its site. Alternatively, the service provider may choose to drop the associate from its associate program if it determines that the associate is attempting to defraud users. If the tokens match, however, the process executes the 1-Click transaction in block 395, sends a thank you page in block 400, and ends.

It will be appreciated that the authentication/validation procedure described above can also be performed when the user selects the "add to shopping cart" button 280. If the validation process is successful, the shopping cart page may be displayed to the user; otherwise, a product detail page or an error message pay be returned to the user.

The techniques described herein to enable 1-Click purchasing of a single item on an associate web site may also be extended to allow the purchase of multiple items from the associate web site with the single click of a button. When multiple items are submitted in a buy box request, aggregate information about the multiple items may be displayed in the buy box. If a user elects to purchase using 1-Click buying or add the multiple items to a shopping cart using the buy box functionality, the item IDs that are transmitted in the buy box to the associate site are compared with the item IDs that are received in the purchase request from the associate site. It will be recognized that this comparison may be performed though the use of a one-way hashed token as described above, or a two-way encryption or lookup table as described in section B, below.

Another variation is to offload some or all of the transaction validation tasks to a referral tracking service provider that manages the associates programs of many different merchants. For example, the task of validating the 1-Click purchase requests, and possibly other types of transaction requests, can be performed by a server system operated by such a referral tracking service provider; if successfully validated, the transaction can then be forwarded or redirected to the merchant web site for fulfillment.

B. Additional Token-Based Transaction Validation Methods

The implementation described above uses a hashing (one-way encryption) algorithm to validate 1-Click purchase requests. As will be appreciated, however, the purchase orders may alternatively be authenticated without the use of a hashing algorithm. For example, in one embodiment, in response to receiving a buy box request, the service provider site assigns a token to the request, and includes this token in the buy box returned to the user's browser—along with the associate ID and item ID. In addition, the service provider site creates an entry within a local look-up table (stored on a server of the service provider's site) to associate this token with the user ID, associate ID, and item ID. The token in this embodiment need not be based on the associate ID, item ID, or user ID; rather, the tokens may simply be sequence numbers, randomly generated values or strings, or values or strings generated using any other appropriate method.

When a purchase request is received in this lookup table based embodiment, the service provider site uses the token contained in this request to look up the corresponding user ID, associate ID, and item ID from the table, and compares these values to the corresponding IDs specified by the purchase request. If the IDs match, the request is treated as valid; otherwise, the request is treated as potentially fraudulent as described above, and is blocked. The transaction may also be treated as potentially fraudulent if the token contained in the purchase request is not found in the table. To prevent buy boxes from being reused, entries may be deleted from the lookup table as they are used to complete transactions. One potential problem with using a lookup table is that the lookup table can require a large amount of storage space and computational overhead for searching, especially when the service provider handles a large number of potential transactions each day. It may therefore be more efficient to use the previously described hashing token method rather than maintaining a lookup table in order to increase computational and storage efficiency. Some efficiency loss may be mitigated by deleting unused entries from the lookup table after a determined period time (e.g. 30 minutes after an entry is created). This time period may be statically determined before buy boxes are created, or it may change dynamically depending on the service provider's resources.

Yet another method is to encode identifiers of the item, associate, and user in the token using a two-way encryption algorithm. With this method, the transaction processing module would validate the transaction by decrypting the token, and then determining whether the associate, user and item IDs extracted from the token correspond to the corresponding IDs transmitted within the purchase request.

One advantage to both the lookup table and two-way encryption approaches is that the merchant web site can vary its response to potentially fraudulent transactions depending upon whether a mismatch is detected in the user ID, the associate ID, and/or the item ID. For example, if the associate ID is detected as having been changed, the purchase request can be treated as an attempt by one associate to "steal" a transaction attributable to another associate. Another benefit of using two way encryption is that a timestamp may be encoded in each token, and later used to determine whether the token/buy box has expired. Similarly, in a lookup table implementation, entries may be deleted after an expiration time period to limit the usable life of each buy box.

These and other token-based transaction validation methods can also be used in any appropriate combination. For instance, the tokens can be generated using a one-way or two-way encryption algorithm as described above; yet lookup table entries may still be created on a server of the merchant web site to map each such tokens to the corresponding associate, user and item; with this method, the table may be used as the primary mechanism for validating transaction requests, while the one-way or two-way encryption algorithm may be used as a back-up if the lookup table becomes corrupted.

C. Validation of Other Types of Transactions

The above-described methods may also be used to validate/authenticate requests for transactions other than purchases. For instance, the same methods may be used to validate/authenticate a request to add an item to a shopping cart (as mentioned above), or a request to add an item to a wish list. Buttons or other links may be provided within the buy box, or other display object, for performing such transactions. The need to validate/authenticate in these situations is not as important as when making purchases, however, because the addition of an item to a shopping cart or to a wish list is a transaction that may be more easily reversed or modified by a user.

In addition, the above-described methods can be applied to single-action payments requested during browsing of external web sites, as described in section VII above. This may be accomplished by replacing the item ID in the above-described purchase request embodiment with an identifier of the payee or pay page.

IX. Payer Preferences for Treatment on External Sites

The SP site 66 may also include functionality for payers to pre-specify how they should be treated by the SP when browsing external (second and/or third party) web sites that host pay boxes or other SP-customized content, or when browsing associate web sites that provide links to buy boxes. For example, each payer may have the option, via an account setup area of the SP site, to specify one or more of the following preferences: (a) whether to be identified within pages of external web sites, including associate web sites, (b) whether to be shown personal product/service recommendations within external web sites, (c) whether to be shown links to related sites, and/or related content, within external sites, (d) whether 1-Click payments may be made from external sites or associates, (f) whether to be shown a running total of payments made to the external site, and (g) whether to be notified when payments made to the external site reach a certain threshold.

These and other preferences may be stored in the "user accounts" database 72 (FIG. 2), and used by the SP site to customize pay box graphics and/or other content displayed within the external sites. The payer may also be given the option to set up one or more payment options for handling 1-Click or other payments made from external sites (e.g., all 1-Click payments made on site A should be charged to credit card A, and all 1-Click payments made on site B charged to credit card B). Many of the possible preferences available for external web sites can also be set with regard to buy boxes displayed in conjunction with associate sites.

Although the invention has been described in terms of certain preferred embodiments, other embodiments that are apparent to those of ordinary skill in the art, including embodiments which do not provide all of the features and advantages set forth herein, are also within the scope of this invention. Accordingly, the scope of the invention is defined by the appended claims, which are intended to be construed without reference to the incorporated-by-reference materials.

What is claimed is:

1. A method of detecting fraudulent associate-based transactions, the method comprising:

receiving a request for a display object from a browser of a user, said request identifying an item, an associate, and the user, and corresponding to a reference contained in an associate web page loaded by the browser;

responding to the request for the display object by at least (1) generating a token that corresponds to the associate, the user, and the item, wherein the correspondence between the token and said associate, user and item is not ascertainable by viewing the token, (2) generating an instance of the display object that provides a user-selectable link for performing a transaction associated with the item, wherein selection of the link causes a transaction request to be transmitted with the token and with identifiers of the item, the associate, and the user, and (3) sending the instance of the display object to the browser of the user for display within, or in conjunction with, the associate web page, said instance of the display object including said token, wherein generating a token that corresponds to the associate, user and item comprises at least one of the following:

(a) applying a one-way hash algorithm to identifiers of the item, user, and associate;

(b) encoding identifiers of the item, user, and associate within the token using a two-way encryption algorithm; and (c) creating a lookup table entry that mares the token to the associate, item and user specified by the request for the display object;

receiving, from the browser of the user, a transaction request that includes a token and that identifies a user, item and associate; and in response to receiving the transaction request from the browser of the user, determining whether the transaction request is valid at least in-part by determining, via execution of instructions by a computing device, whether the token received with the transaction request corresponds to the user, item and associate identified within the transaction request, said determination of whether the received token corresponds to the identified user, item and associate reflecting whether the instance of the display object has been fraudulently modified by changing the associate identifier, user identifier and/or item identifier.

2. The method of claim 1, wherein generating the token comprises applying a one-way hash algorithm to identifiers of the item, user, and associate.

3. The method of claim 1, wherein generating the token comprises encoding identifiers of the item, user, and associate within the token using a two-way encryption algorithm.

4. The method of claim 1, wherein generating the token comprises creating a lookup table entry that maps the token to the associate, item and user specified by the request for the display object.

5. The method of claim 1, wherein the display object is adapted to be displayed in a pop-up browser window when a user selects said reference while viewing the associate web page.

6. The method of claim 1, wherein the reference causes the browser to request the display object when the browser loads the associate web page.

7. The method of claim 6, wherein the display object is an image that is displayed within the associate web page.

8. The method of claim 1, wherein the transaction is a single-action purchase transaction.

9. The method of claim 1, wherein the transaction is a request to add the item to a shopping cart.

10. The method of claim 1, wherein the transaction is a request to add the item to a wish list.

11. A server system that performs the method of claim 1.

12. The method of claim 1, wherein the method, including receiving the request for a display object, responding to the request, receiving the transaction request, and determining whether the transaction request is valid, is performed by a server system that comprises one or more computers.

13. The method of claim 1, wherein the transaction is a purchase transaction, and the method comprises executing the transaction without requiring the user to enter a username, password, or other authentication information.

14. The method of claim 13, wherein the method is performed by a merchant web site that is separate from the associate web site, said merchant web site and associate web site operated by different respective entities.

15. The method of claim 14, wherein the purchase transaction is executed by the merchant web site in response to a single action performed by the user on the instance of the display object as displayed within the associate web page.

16. A system for enabling a user to conduct a transaction with a first web site operated by a first entity during browsing of a second web site operated by a second entity, said transaction being specific to an item, the system comprising:
an object generation system that is responsive to an object request from a computing device of the user by generating, and sending to the computing device, a display object for presentation to the user within, or in conjunction with, a web page of the second web site, said display object including encrypted information that corresponds to the second entity, the user, and the item, said display object being selectable by the user to cause a transaction request containing said encrypted information to be transmitted from the computing device of the user to the first web site, said object generation system comprising computer hardware; and
a transaction request processing system that is responsive to the transaction request by using at least the encrypted information corresponding to the second entity, the user, and the item to determine whether the transaction request is valid, said transaction request processing system being part of the first web site;
wherein the object generation system is operative to generate the encrypted information, at least in part, by applying a one-way hash function or a two-way encryption algorithm to identifiers of the second entity, user, and item, and the transaction request processing system is operative to perform a comparison to determine whether the encrypted information corresponds to said identifiers of the second entity, user, and item, said transaction request processing system thereby capable of detecting attempts by users to generate fraudulent transaction requests using modified versions of the display object.

17. The system of claim 16, wherein the transaction request processing system is operative to determine whether the encrypted information included in the transaction request matches unencrypted transaction information included in the transaction request.

18. The system of claim 16, wherein the transaction request processing system is operative to use the encrypted information to determine whether the transaction request corresponds to the same second entity, user, and item for which the display object was generated by the object generation system, and is thereby capable of detecting attempts to use fraudulently modified versions of the display object.

19. The system of claim 16, wherein the object generation system comprises a physical server system that responds to requests received over a network.

20. The system of claim 16, wherein the object generation system is operative to generate the encrypted information at least in part by applying a one-way hash function to identifiers of the second entity, user, and item, and the transaction request processing system is operative to use the one-way hash function to determine whether the transaction request is valid.

21. The system of claim 20, wherein the object generation system is operative to generate the display object such that the transaction request additionally includes the identifiers of the second entity, user, and item in an unencrypted form, and wherein the transaction request processing system is operative to apply the one-way hash function to said unencrypted identifiers, and to compare a result thereof to the encrypted information to determine whether the transaction request is valid.

22. The system of claim 16, wherein the object generation system is operative to generate the encrypted information at least in part by applying a two-way encryption algorithm to identifiers of the second entity, user, and item.

23. The system of claim 22, wherein the transaction processing system is operative to respond differently to the transaction request being found invalid depending upon which of said identifiers has been changed.

24. The system of claim 16, wherein the transaction processing system is responsive to the transaction request, when said transaction request is determined to be valid, by executing the transaction to completion without requiring any further user action.

25. The system of claim 24, wherein the transaction is a single-action purchase transaction.

26. The system of claim 25, wherein the system is operative to execute the transaction request without requiring the user to enter a username, password, or other authentication information.

27. The system of claim 24, wherein the transaction comprises an addition of the item to a shopping cart hosted by the first web site.

28. The system of claim 16, wherein the object generation system and the transaction request processing system collectively enable the user to perform the transaction during browsing of the second web site without having to navigate away from the second web site.

29. The system of claim 16, wherein the object generation system and the transaction request processing system collectively enable the user to perform the transaction during browsing of the second web site without having to load a web page of the first web site.

30. The system of claim 16, wherein the object generation system is operative to personalize the display object for the user, at least in part, by incorporating into the display object functionality for the user to select a particular shipping address from a set of pre-specified shipping addresses.

31. The system of claim 16, wherein the transaction processing system is operative to cause a commission amount to be credited to an account of the second entity when the transaction is completed.

32. The system of claim 16, wherein the system causes the display object to be presented to the user as part of the web page.

33. The system of claim 16, further comprising an interactive link generation tool that generates customized link coding that is adapted to be added to the web page by the second entity to enable said display object to be requested by computing devices that load the web page.

* * * * *

UNITED STATES PATENT AND TRADEMARK OFFICE
CERTIFICATE OF CORRECTION

PATENT NO. : 7,599,856 B2  Page 1 of 1
APPLICATION NO. : 10/299963
DATED : October 6, 2009
INVENTOR(S) : Agrawal et al.

It is certified that error appears in the above-identified patent and that said Letters Patent is hereby corrected as shown below:

At col. 32, line 53, change "mares" to --maps--.

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,599,856 B2
APPLICATION NO. : 10/299963
DATED : October 6, 2009
INVENTOR(S) : Agrawal et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1950 days.

Signed and Sealed this

Fourteenth Day of December, 2010

David J. Kappos
*Director of the United States Patent and Trademark Office*